US 9,740,773 B2

(12) United States Patent
Grokop et al.

(10) Patent No.: US 9,740,773 B2
(45) Date of Patent: Aug. 22, 2017

(54) CONTEXT LABELS FOR DATA CLUSTERS

(71) Applicant: QUALCOMM Incorporated, San Diego, CA (US)

(72) Inventors: Leonard Henry Grokop, San Diego, CA (US); Shankar Sadasivam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/831,393

(22) Filed: Mar. 14, 2013

(65) Prior Publication Data
US 2014/0129560 A1 May 8, 2014

Related U.S. Application Data

(60) Provisional application No. 61/721,919, filed on Nov. 2, 2012.

(51) Int. Cl.
*G06F 17/30* (2006.01)
*H04M 1/725* (2006.01)
(Continued)

(52) U.S. Cl.
CPC ....... *G06F 17/30705* (2013.01); *G05B 13/00* (2013.01); *G06F 15/18* (2013.01);
(Continued)

(58) Field of Classification Search
CPC .......... G06F 17/3071; G06F 17/30864; G06F 17/30598; G06F 17/30705; G06F 17/30265
(Continued)

(56) References Cited

U.S. PATENT DOCUMENTS 7,302,451 B2 * 11/2007 Radhakrishnan . G06F 17/30787
7,366,705 B2 * 4/2008 Zeng ................... G06F 17/3071
706/20
(Continued)

FOREIGN PATENT DOCUMENTS

CN 101848278 A 9/2010
CN 102667840 A 9/2012
(Continued)

OTHER PUBLICATIONS

International Search Report and Written Opinion—PCT/US2013/058669—ISA/EPO—Jan. 31, 2014.
(Continued)

*Primary Examiner* — Pierre Vital
*Assistant Examiner* — Andrew N Ho
(74) *Attorney, Agent, or Firm* — Hunter Clark PLLC

(57) ABSTRACT

Systems and methods for applying and using context labels for data clusters are provided herein. A method described herein for managing a context model associated with a mobile device includes obtaining first data points associated with a first data stream assigned to one or more first data sources; assigning ones of the first data points to respective clusters of a set of clusters such that each cluster is respectively assigned ones of the first data points that exhibit a threshold amount of similarity and are associated with times within a threshold amount of time of each other; compiling statistical features and inferences corresponding to the first data stream or one or more other data streams assigned to respective other data sources; assigning context labels to each of the set of clusters based on the statistical features and inferences.

46 Claims, 13 Drawing Sheets

(51) Int. Cl.
*G06N 5/04* (2006.01)
*G05B 13/00* (2006.01)
*G06F 15/18* (2006.01)

(52) U.S. Cl.
CPC .... *G06F 17/3071* (2013.01); *G06F 17/30265* (2013.01); *G06F 17/30598* (2013.01); *G06F 17/30702* (2013.01); *G06F 17/30864* (2013.01); *G06N 5/043* (2013.01); *H04M 1/72569* (2013.01)

(58) Field of Classification Search
USPC .......................................................... 707/737
See application file for complete search history.

(56) References Cited

U.S. PATENT DOCUMENTS

| | | | |
|---|---|---|---|
| 7,865,505 B2 | 1/2011 | Arasu et al. | |
| 8,135,850 B2* | 3/2012 | Narayana et al. | 709/228 |
| 8,266,082 B2 | 9/2012 | Lu et al. | |
| 8,429,103 B1* | 4/2013 | Aradhye | G06N 99/005 706/12 |
| 8,924,345 B2* | 12/2014 | Bryan et al. | 707/610 |
| 2003/0009693 A1 | 1/2003 | Brock et al. | |
| 2004/0259536 A1 | 12/2004 | Keskar et al. | |
| 2008/0183693 A1 | 7/2008 | Arasu et al. | |
| 2008/0249968 A1* | 10/2008 | Flinn et al. | 706/14 |
| 2009/0119246 A1 | 5/2009 | Kansal | |
| 2009/0157593 A1* | 6/2009 | Hayashi | G06Q 10/10 707/1 |
| 2009/0177484 A1* | 7/2009 | Davis | G06Q 30/02 705/346 |
| 2009/0190544 A1 | 7/2009 | Meylan et al. | |
| 2009/0222472 A1* | 9/2009 | Aggarwal | G06F 17/30489 707/102 |
| 2009/0224867 A1 | 9/2009 | O'Shaughnessy et al. | |
| 2010/0114889 A1* | 5/2010 | Rabii et al. | 707/737 |
| 2010/0138452 A1 | 6/2010 | Henkin et al. | |
| 2010/0161541 A1 | 6/2010 | Covannon et al. | |
| 2010/0205061 A1 | 8/2010 | Karmarkar | |
| 2010/0250196 A1 | 9/2010 | Lawler et al. | |
| 2010/0299319 A1 | 11/2010 | Parson et al. | |
| 2010/0299615 A1* | 11/2010 | Miluzzo et al. | 715/752 |
| 2010/0317371 A1* | 12/2010 | Westerinen et al. | 455/456.6 |
| 2011/0119270 A1* | 5/2011 | Jin | G06F 17/30516 707/737 |
| 2011/0125678 A1 | 5/2011 | Partridge | |
| 2012/0059780 A1* | 3/2012 | Kononen et al. | 706/14 |
| 2012/0115453 A1* | 5/2012 | Zheng | 455/418 |
| 2012/0290950 A1* | 11/2012 | Rapaport et al. | 715/753 |
| 2012/0303271 A1 | 11/2012 | Chowdhary et al. | |
| 2013/0057394 A1* | 3/2013 | Andiappan | H04M 1/72569 340/10.51 |
| 2013/0103212 A1 | 4/2013 | Andiappan | |
| 2014/0156659 A1 | 6/2014 | Grokop et al. | |

FOREIGN PATENT DOCUMENTS

| | | | | |
|---|---|---|---|---|
| EP | 1916828 A1 | 4/2008 | | |
| EP | 1939797 A1 | 7/2008 | | |
| EP | 2447809 A2 | 5/2012 | | |
| EP | 2608503 A1 | 6/2013 | | |
| FR | EP 1916828 A1 * | 4/2008 | ........ | H04M 1/72569 |
| JP | EP 1939797 A1 * | 7/2008 | ............. | G06N 5/022 |
| KR | EP 2447809 A2 * | 5/2012 | ........ | H04M 1/72569 |
| KR | 20120092459 A | 8/2012 | | |
| WO | 2011141761 A1 | 11/2011 | | |
| WO | 2012001215 A1 | 1/2012 | | |

OTHER PUBLICATIONS

International Preliminary Report on Patentability—PCT/US2013/058669, The International Bureau of WIPO—Geneva, Switzerland, Feb. 17, 2015, 8 pages.
International Preliminary Report on Patentability—PCT/US2013/071489 The International Bureau of WIPO—Geneva, Switzerland, Feb. 20, 2015, 8 pgs.
International Search Report and Written Opinion—PCT/US2013/071489—ISA/EPO—Mar. 17, 2014, 11 pgs.

* cited by examiner

CONTEXT LABELS FOR DATA CLUSTERS

CROSS-REFERENCE TO RELATED APPLICATIONS

This application claims the benefit of U.S. Provisional Application No. 61/721,919, filed Nov. 2, 2012, entitled "CONTEXT LABELS FOR DATA CLUSTERS," which is incorporated herein by reference in its entirety for all purposes.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment. Such tasks may be aided by the ability of a device to detect and use device and user context information, such as the location of a device, events occurring in the area of the device, etc., in performing and customizing functions of the device.

SUMMARY

An example of a method for managing a context model associated with a mobile device includes: obtaining first data points associated with a first data stream assigned to one or more first data sources; assigning ones of the first data points to respective clusters of a set of clusters such that each cluster is respectively assigned ones of the first data points that exhibit a threshold amount of similarity and are associated with times within a threshold amount of time of each other; compiling statistical features and inferences corresponding to the first data stream or one or more other data streams assigned to respective other data sources; assigning context labels to each of the set of clusters based on the statistical features and inferences.

Implementations of the method may include one or more of the following features. The first data sources or the other data sources include at least one of an audio sensor, a location sensor, a network sensor, a motion sensor, a camera, or a calendar. The statistical features include at least one of satellite positioning fixes, time measurements, weather data, light sensor readings, proximity sensor readings, camera data, proximate points of interest, Bluetooth measurement, Wi-Fi measurements, ambient audio level, or movement detection. The statistical inferences include at least one of motion state, device position, speech detection, speaker recognition, target sound detection, or location detection. The first data sources include multiple sensors. The method further includes generating a context model using the context labels and the set of clusters. The method further includes obtaining second data points associated with a second data stream assigned to one or more second data sources; determining a cluster of the set of clusters that corresponds to the second data points; and selecting a context label associated with the determined cluster.

Also or alternatively, implementations of the method may include one or more of the following features. Assigning the context labels includes selecting context labels from a set of context labels for each of the set of clusters. The method further includes identifying at least one cluster among the set of clusters having less than a threshold degree of relation to any context label associated with the set of clusters; and creating a new context label for the at least one cluster. The method further includes identifying at least one cluster among the set of clusters having less than a threshold degree of relation to any context label associated with the set of clusters; and assigning an unknown context label to the at least one cluster. The obtaining includes identifying a user of the mobile device; the first data points include data corresponding to the user of the mobile device; and the method further includes creating a user context model for the user of the mobile device based on the context labels and the set of clusters. The first data points include data corresponding to a first user of the mobile device and at least one second user of the mobile device or one or more other devices; and the method further includes creating a multi-user context model for the first user and the at least one second user based on the context labels and the set of clusters.

An example of a method for performing a context inference based on a context model includes: retrieving the context model, the context model including sensor data points temporally grouped into respective ones of a set of clusters and context labels assigned to each of the set of clusters; obtaining first data points associated with a first data stream assigned to one or more first data sources; determining at least one cluster of the context model that is representative of the first data points; and selecting an output context label associated with the at least one determined cluster.

Implementations of the method may include one or more of the following features. The determining includes assigning confidence levels to multiple clusters among the set of clusters that correspond to the first data points. The selecting includes selecting a context label corresponding to a cluster of the context model having a highest confidence level. The selecting includes generating a vector of respective ones of the set of clusters and their respective confidence levels. The method further includes collecting additional data from at least one sensor when one or more of the confidence levels are below a threshold. The selecting includes directing collection of additional data from the one or more first data sources; and selecting the output context label based on the additional data collected from the one or more first data sources in response to the directing.

Also or alternatively, implementations of the method may include one or more of the following features. The method further includes obtaining second data points associated with a second data stream assigned to one or more second data sources, and the determining includes determining clusters of the context model that correspond to the first data points and the second data points. The selecting includes selecting a first context label associated with a first cluster that is representative of the first data points; selecting a second context label associated with a second cluster that is representative of the second data points; and determining the output context label by combining the first context label and the second context label. The method further includes performing a first context inference based on the selected output context label; performing a second context inference based on instantaneous features and inferences derived from the second data sources; and combining the first context inference and the second context inference to obtain a combined context inference.

An example of an apparatus that facilitates managing an associated context model includes: one or more first data sources configured to provide first data points associated with a first data stream; a clustering module communicatively coupled to the first data sources and configured to assign ones of the first data points to respective clusters of a set of clusters such that each cluster is respectively assigned ones of the first data points that exhibit a threshold amount of similarity and are associated with times within a threshold amount of time of each other; a statistics module communicatively coupled to the first data sources and the clustering module and configured to compile statistical features and inferences for the first data stream or one or more other data streams assigned to respective other data sources; and a context modeling module communicatively coupled to the clustering module and the statistics module and configured to assign context labels to one or more of the set of clusters based on the statistical features and inferences.

Implementations of the apparatus may include one or more of the following features. The first data sources include at least one of an audio sensor, a location sensor, a network sensor, a motion sensor, a camera, or a calendar. The statistics module is further configured to determine statistical inferences comprising at least one of motion state, device position, speech detection, speaker recognition, target sound detection, or location detection. The context modeling module is further configured to generate a context model using the context labels and the set of clusters. The apparatus further includes one or more second data sources communicatively coupled to the clustering module and configured to provide second data points associated with a second data stream, the clustering module is further configured to determine a cluster of the context model that corresponds to the second data points, and the apparatus further includes a context inference module communicatively coupled to the context modeling module and the clustering module and configured to select a context label associated with the determined cluster.

Also or alternatively, implementations of the apparatus may include one or more of the following features. The context modeling module is further configured to identify at least one cluster among the set of clusters having less than a threshold degree of relation to any context label associated with the set of clusters and to create a new context label for the at least one cluster. The context modeling module is further configured to identify at least one cluster among the set of clusters having less than a threshold degree of relation to any context label associated with the set of clusters and to assign an unknown context label to the at least one cluster.

An example of an apparatus for performing a context inference based on a context model includes: a context modeling module configured to provide a context model, the context model including sensor data points temporally grouped into respective ones of a set of clusters and context labels assigned to each of the set of clusters; one or more first data sources configured to provide first data points associated with a first data stream; and a context inference module communicatively coupled to the context modeling module and the one or more first data sources and configured to determine at least one cluster of the context model that is representative of the first data points and to select an output context label associated with the at least one determined cluster.

Implementations of the apparatus may include one or more of the following features. The context inference module is further configured to assign confidence levels to a plurality of clusters among the set of clusters that correspond to the first data points. The context inference module is further configured to select a context label corresponding to a cluster of the context model having a highest confidence level. The apparatus further includes one or more second data sources communicatively coupled to the context inference module and configured to provide second data points associated with a second data stream, and the context inference module is further configured to determine clusters of the context model that correspond to the first data points and the second data points. The context inference module is further configured to select a first context label associated with a first cluster that is representative of the first data points, to select a second context label associated with a second cluster that is representative of the second data points, and to determine the output context label by combining the first context label and the second context label. The context inference module is further configured to perform a first context inference based on the selected output context label, to perform a second context inference based on instantaneous features and inferences derived from the second data sources, and to combine the first context inference and the second context inference to obtain a combined context inference. The first data sources include at least one of an audio sensor, a location sensor, a network sensor, a motion sensor, a camera, or a calendar.

An example of an apparatus for managing a context model associated with a mobile device includes: means for obtaining first data points associated with a first data stream assigned to one or more first data sources; means for assigning ones of the first data points to respective clusters of a set of clusters such that each cluster is respectively assigned ones of the first data points that exhibit a threshold amount of similarity and are associated with times within a threshold amount of time of each other; means for compiling statistical features and inferences for the first data stream or one or more other data streams assigned to respective other data sources; and means for associating one or more of the set of clusters with context labels based on the statistical features and inferences.

Implementations of the apparatus may include one or more of the following features. The apparatus further includes means for generating a context model using the context labels and the set of clusters. The apparatus further includes means for obtaining second data points associated with a second data stream assigned to one or more second data sources; the means for assigning includes means for determining a cluster of the context model that corresponds to the second data points; and the apparatus further includes means for selecting at least one of the context labels that is associated with the determined cluster. The apparatus further includes means for identifying at least one cluster among the set of clusters having less than a threshold degree of relation to any context label associated with the set of clusters; and means for creating a new context label for the at least one cluster or assigning an unknown context label to the at least one cluster.

Also or alternatively, implementations of the apparatus may include one or more of the following features. The first data sources or the other data sources include at least one of an audio sensor, a location sensor, a network sensor, a motion sensor, a camera, or a calendar. The statistical features include at least one of satellite positioning fixes, time measurements, weather data, light sensor readings, proximity sensor readings, camera data, proximate points of interest, Bluetooth measurement, Wi-Fi measurements, ambient audio level, or movement detection. The statistical inferences include at least one of motion state, device position, speech detection, speaker recognition, target sound detection, or location detection. The first data sources include a plurality of sensors. The means for associating includes means for selecting context labels from a set of context labels for each of the set of clusters. The means for obtaining includes means for identifying a user of the mobile device; the first data points include data corresponding to the user of the mobile device; and the apparatus further includes means for creating a user context model for the user of the mobile device based on the context labels and the set of clusters. The first data points include data corresponding to a first user of the mobile device and at least one second user of the mobile device or one or more other devices; and the apparatus further includes means for creating a multi-user context model for the first user and the at least one second user based on the context labels and the set of clusters.

An example of an apparatus for performing a context inference based on a context model includes: means for retrieving a context model, the context model including sensor data points temporally grouped into respective ones of a set of clusters and context labels assigned to each of the set of clusters; means for obtaining first data points from one or more first data sources associated with a first data stream; means for determining at least one cluster of the context model that is representative of the first data points; and means for selecting an output context label associated with the at least one determined cluster.

Implementations of the apparatus may include one or more of the following features. The apparatus further includes means for obtaining second data points from one or more second data sources associated with a second data stream, and the means for determining includes means for determining clusters of the context model that correspond to the first data points and the second data points. The means for selecting includes means for selecting a first context label associated with a first cluster that is representative of the first data points; means for selecting a second context label associated with a second cluster that is representative of the second data points; and means for selecting the output context label by combining the first context label and the second context label. The apparatus further includes means for performing a first context inference based on the output context label; means for performing a second context inference based on instantaneous features and inferences derived from the second data sources; and means for combining the first context inference and the second context inference to obtain a combined context inference. The first data sources include at least one of an audio sensor, a location sensor, a network sensor, a motion sensor, a camera, or a calendar.

Also or alternatively, implementations of the apparatus may include one or more of the following features. The means for determining includes means for assigning confidence levels to a plurality of clusters among the set of clusters that correspond to the first data points. The means for selecting includes means for selecting a context label corresponding to a cluster of the context model having a highest confidence level. The means for selecting includes means for generating a vector of respective ones of the set of clusters and their respective confidence levels. The apparatus further includes means for collecting additional data from at least one sensor when one or more of the confidence levels are below a threshold. The means for selecting includes means for directing collection of additional data from the one or more first data sources; and means for selecting the output context label based on the additional data collected from the one or more first data sources in response to the means for directing.

An example of a processor-executable computer storage medium includes processor-executable instructions configured to cause a processor to: obtain first data points associated with a first data stream assigned to one or more first data sources; assign ones of the first data points to respective clusters of a set of clusters such that each cluster is respectively assigned ones of the first data points that exhibit a threshold amount of similarity and are associated with times within a threshold amount of time of each other; compile statistical features and inferences for the first data stream or one or more other data streams assigned to respective other data sources; and associate one or more of the set of clusters with context labels based on the statistical features and inferences.

Implementations of the computer storage medium may include one or more of the following features. The computer storage medium further includes instructions for causing the processor to generate a context model using the context labels and the set of clusters. The computer storage medium further includes instructions configured to cause the processor to obtain second data points associated with a second data stream assigned to one or more second data sources; determine a cluster of the context model that corresponds to the second data points; and select at least one of the context labels that is associated with the determined cluster.

Another example of a processor-executable computer storage medium includes processor-executable instructions configured to cause a processor to: retrieve a context model, the context model including sensor data points temporally grouped into respective ones of a set of clusters and context labels assigned to each of the set of clusters; obtain first data points from one or more first data sources associated with a first data stream; determine at least one cluster of the context model that is representative of the first data points; and select an output context label associated with the at least one determined cluster.

Implementations of the computer program product may include one or more of the following features. The computer storage medium further includes instructions configured to cause the processor to obtain second data points from one or more second data sources associated with a second data stream; and determine clusters of the context model that correspond to the first data points and the second data points. The computer storage medium further includes instructions configured to cause the processor to select a first context label associated with a first cluster that is representative of the first data points; select a second context label associated with a second cluster that is representative of the second data points; and select the output context label by combining the first context label and the second context label. The computer storage medium further includes instructions configured to cause the processor to perform a first context inference based on the output context label; perform a second context inference based on instantaneous features and inferences derived from the second data sources; and combine the first context inference and the second context inference to obtain a combined context inference.

Items and/or techniques described herein may provide one or more of the following capabilities, as well as other capabilities not mentioned. Accuracy of context inferences and/or determinations can be increased, enabling more relevant data and/or applications to be provided to a user. Context-related data is temporally grouped, reducing errors associated with rapidly switching between different context inferences. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
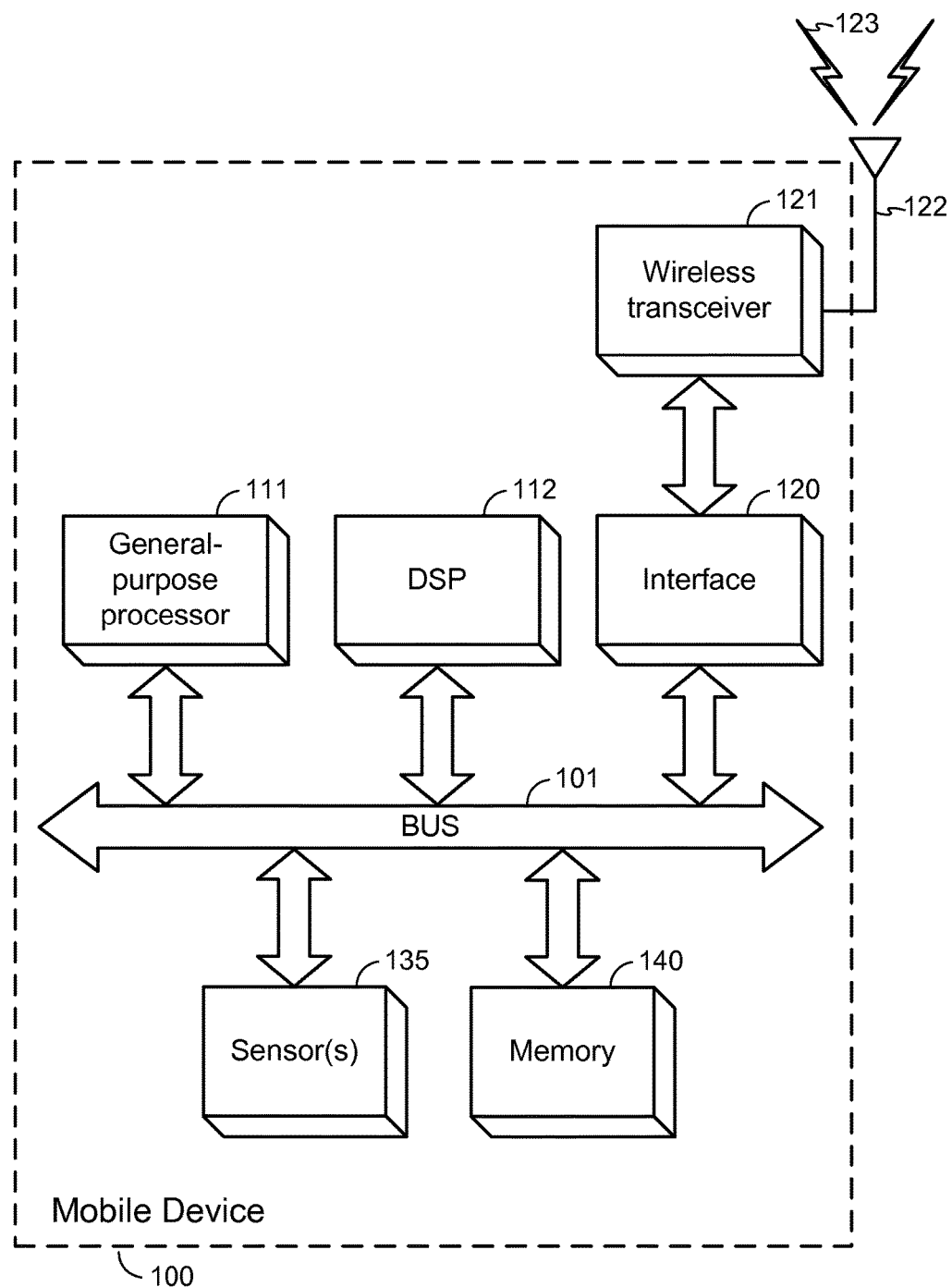
FIG. 1 is a block diagram of components of a mobile computing device.

Described herein are techniques for learning context labels for clusters by compiling statistics of features derived from device sensor data. The techniques described herein can be used to aid in context determination for devices such as smartphones, laptop or tablet computers, personal digital assistants (PDAs), etc., as well as any other computing device presently existing or existing in the future. Other uses may also be possible. While various examples given in the description below relate to mobile computing devices, the techniques described herein can be applied to any device for which context inference is desirable.

Advancements in mobile device technology have given mobile devices the ability to detect and use device and user context information, such as the location of a device, events occurring in the area of the device, etc., in performing and customizing functions of the device. One way in which a mobile device can be made aware of its user's context is the identification of dialogue in the ambient audio stream. For instance, a device can monitor the ambient audio environment in the vicinity of the device and its user and determine when conversation is taking place. This information can then be used to trigger more detailed inferences such as speaker and/or user recognition, age and/or gender estimation, estimation of the number of conversation participants, etc. Alternatively, the act of identifying conversation can itself be utilized as an aid in context determination. For instance, detected conversation can be utilized to determine whether a user located in his office is working alone or meeting with others, which may affect the interruptibility of the user.

Further, an objective of mobile context awareness is to have a device infer what its user is doing. This can be evaluated along multiple dimensions, such as by the type of place the user is located (e.g., office, conference room, lecture hall, home, gym, restaurant, coffee shop, bar, etc.) or the type of situation the user is in (e.g., meeting, working alone, driving, having lunch, working out, sleeping, etc.). Each such dimension is referred to herein as a context. By inferring user contexts, a range of applications are facilitated, such as, but not limited to, the following:

1) Automating device functionality such as diverting calls to voicemail or responding to text messages when the user is uninterruptible, adjusting the ringer volume based on the environment, notifying meeting participants when the user is running late, etc.

2) Automating social networking interaction such as check-ins, notifying friends when the user is nearby, etc.

3) Providing health care information such as calories burned, miles walked, hours spent at work vs. play, etc.

4) Facilitating accurate and timely recommendations such as for restaurants, shops, consumer products, gasoline, etc.

One approach to inferring user contexts is to learn them, statistically or otherwise, from computed low-level inferences and features. Examples of low-level inferences are whether or not speech is present in an audio data stream, the motion state (walking, sitting, driving, etc.) of a user as determined based on an accelerometer data stream, whether the user is at home/work/in transit/at an unknown location, whether the user is indoors or outdoors (e.g., based on the number of Global Positioning System (GPS) or other SPS satellites visible), etc. Examples of low-level features are GPS velocity, number of Bluetooth devices within range, number of Wi-Fi access points visible, proximity sensor count, ambient light level, average camera intensity, time of day, day of week, weekday or weekend, ambient audio energy level, etc. The above is not an exhaustive list, and other low-level features and/or inferences could be used.

As an example of using low-level features and inferences, if speech is present, a device is at rest, there are many Bluetooth devices within range, the day is a weekday, the time of day is a work hour, and a user of the device is at work, the situation context of the user could be inferred to be an "in meeting" state.

Instantaneously inferring user contexts based on hard sensor data has presented challenges due to noisy mappings between user context and data. For example, when a user is in a meeting the most common output of a speech detector may be "speech" (as opposed to "no speech"), the most common device motion state may be "device at rest," and there may typically be many Bluetooth devices within range. Despite this, it is still possible that at the time these low-level features/inferences are computed, speech may be determined to be not present, the motion state may reveal the device to not be at rest, and/or there may be no Bluetooth devices within range. To account for these variations, the contextual inferences may be averaged via temporal filtering. However, these averaging operations may result in the context inference crossing transition boundaries between contexts and, as a result, may cause noise and inaccuracy in the context inference.

To mitigate these difficulties, techniques described herein temporally cluster data corresponding to one or more users and use these clusters in combination with the low-level features and inferences described above to infer user context. In some embodiments, clustered data may be used to define the boundaries between different user contexts. Further, inferring context as described with respect to certain embodiments below may allow for the compilation of meaningful statistics from obtained data across an appropriate time window(s), for example as determined by clusters. Those of skill in the art will appreciate other advantages and benefits of the embodiments described herein.

The techniques described herein can be utilized for a mobile device, such as the example mobile device 100 illustrated in FIG. 1. The mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111 and DSP 112 are connected to the bus 101, either directly or by a bus interface 110. Additionally, the memory 140 is connected to the bus 101 either directly or by a bus interface (not shown). The bus interfaces 110, when implemented, can be integrated with or independent of the general-purpose processor 111, DSP 112 and/or memory 140 with which they are associated.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software code (programming code, instructions, etc.) configured to cause the processor 111 and/or DSP 112 to perform the functions described. Alternatively, one or more functions of the mobile device 100 may be performed in whole or in part in hardware.

The mobile device 100 further includes one or more sensors 135 that capture data associated with the mobile device 100 and/or its surroundings. The sensors 135 may include, but are not limited to, microphones or audio sensors, cameras, light sensors, pressure sensors, inertial sensors (e.g., accelerometers and/or gyroscopes), magnetometers, etc. The sensors 135 may be used individually or in combinations, such as sensor arrays or any other combinations. Multiple sensors 135, if implemented by the mobile device 100, can operate interdependently or independently of one another. The sensors 135 are connected to the bus 101, either independently or through a bus interface (not shown). For instance, the sensors 135 can communicate with the DSP 112 through the bus 101 in order to process data captured by the sensors 135. The sensors 135 can additionally communicate with the general-purpose processor 111 and/or memory 140 to generate or otherwise obtain metadata associated with captured data. In some embodiments, the antenna 122 and/or transceiver 121 may also be utilized as sensors, for example to sense or detect wireless signals such as Wi-Fi signals.

Figure 2:
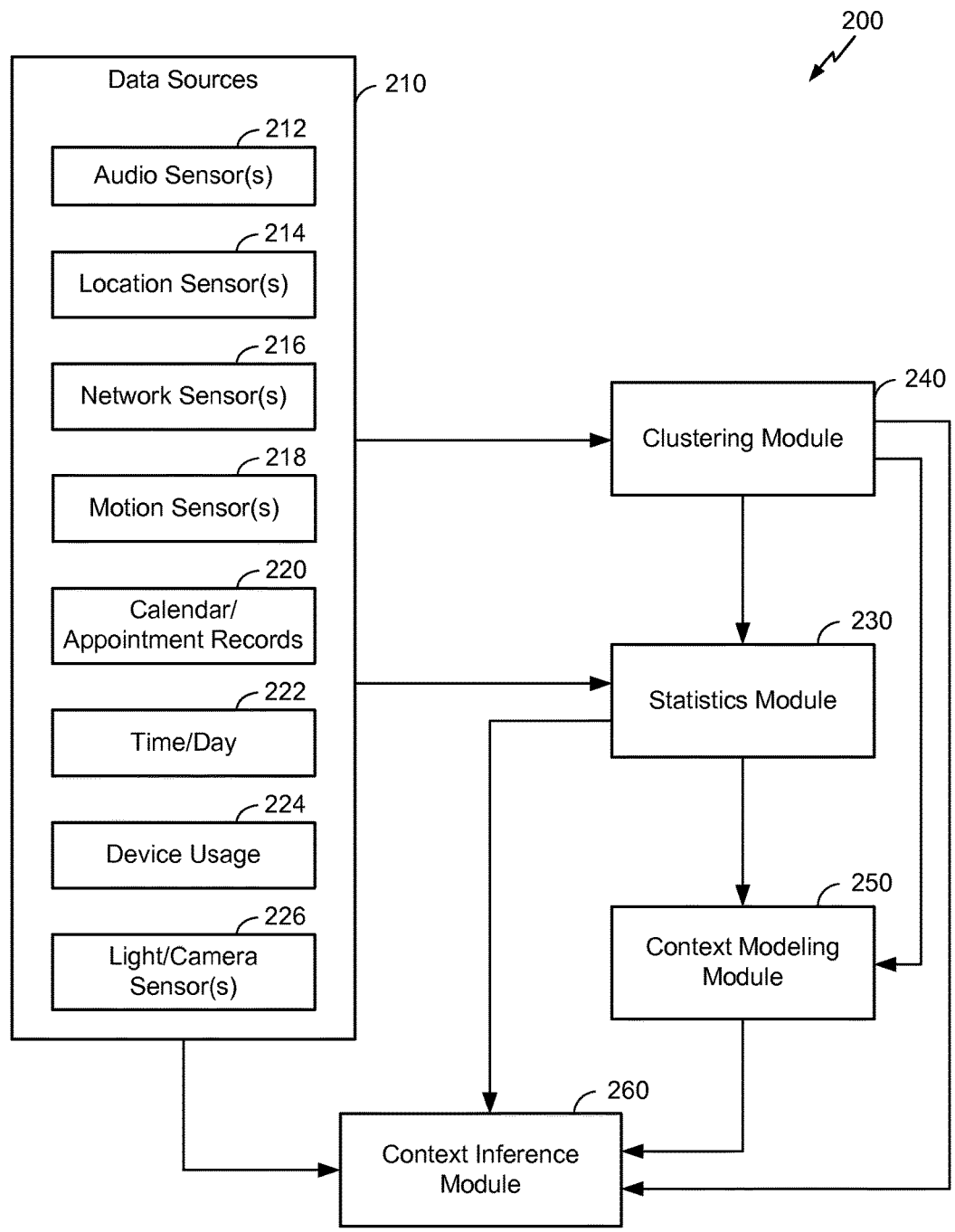
FIG. 2 is a block diagram of a context modeling and inference system.

FIG. 2 illustrates an embodiment of a context modeling and inference system 200 that can be utilized by the mobile device 100 shown in FIG. 1. The system 200 includes one or more data sources 210, which may include, but are not limited to, audio sensors 212 such as microphones, location sensors 214 such as GPS transceivers, network sensors 216 such as Wi-Fi and/or other radio transceivers, motion sensors 218 such as accelerometers or gyroscopes, calendar/appointment records 220, sources of time/day information 222 such as a system clock or other mechanisms, device usage monitors 224, light and/or camera sensors 226, etc. Data gathered from the data sources 210 are processed in combination with time data (e.g., provided by a system clock) using a statistics module 230 and a clustering module 240. The statistics module 230 identifies and compiles statistics associated with low-level features and/or inferences associated with the data sources 210. The clustering module 240 identifies and labels clusters of data collected from the data sources 210 with aid from the statistics module 230. The clusters are then utilized by a content modeling module 250 to construct a device context model for the mobile device 100. A context inference module 260 subsequently utilizes the model generated by the context modeling module 250 to infer device contexts for newly received data.

As generally described herein, a model may be generated by the context modeling module 250 for a specific identified user (e.g., of a mobile device) by collecting data points corresponding to the user via the data sources 210 and creating a user-specific context model using these data points and the clusters and labels generated from the data points. Alternatively, data may be collected across multiple users, e.g., a user of a mobile device and one or more other users of the same device and/or other devices, from which a multi-user context model can be generated.

Data collected from the data sources 210 can take any form usable by the clustering module 240 and/or context inference module 260. For instance, such data can include audio samples from the audio sensors 212; GPS readings from the location sensors 214; network strength and/or other network-related readings from the network sensors 216; motion, acceleration or orientation data from the motion sensors 218, entries associated with a calendar 220, etc. In addition to the data, labels applied to the data can also be utilized. For instance, calendar entries may be labeled with a location or title, e.g., "user's office" or "doctor appointment." Techniques for collecting and applying these data are described in further detail below.

Figure 3:
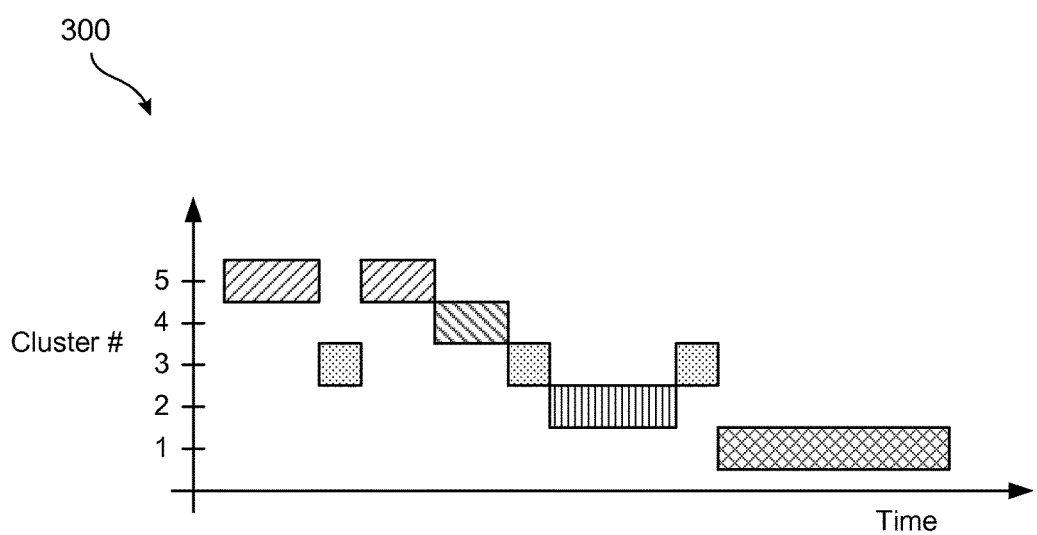
FIGS. 3-4 are illustrative views of example data clusters collected by the system of FIG. 2.

The clustering module 240 performs clustering, such as temporal clustering or other clustering, of a data stream corresponding to the data sources 210. Clustering refers to grouping data points that appear similar in some feature space (e.g., such that the data points exhibit at least a threshold amount of similarity) and/or are associated with similar times (e.g., collected at and/or are otherwise associated with times that are within a threshold amount of time of each other). For instance, as shown in diagram 300 in FIG. 3, clusters may correspond to sets of data points grouped in time that exhibit similar feature profiles. The cluster indexes 1-5 shown here may correspond to any grouping of features and/or sets of features, e.g., audio samples from an audio sensor 212 found to contain speech or no speech, position fixes from a location sensor 214 within a predefined radius or at a known address, readings from a motion sensor 218 corresponding to a common motion state (walking, running, etc.), etc. Other features are also possible, as discussed herein. Upon subsequently obtaining data points that do not correspond to a current cluster, a transition to a new cluster occurs. For instance, diagram 300 illustrates transitions between clusters (e.g., cluster 5 to cluster 3, cluster 3 to cluster 5, . . . ) based on changes in the obtained data points.

As another example of clustering, if the data stream consists of a trace of latitude/longitude coordinates obtained by performing GPS fixes, clustering may involve grouping the fixes into a finite number of places at which the user visits and spends time. Thus, one distinct segment of consecutive fixes in time may correspond to a user being at home, and may belong to the same cluster as a second distinct segment of consecutive fixes that occurs on a different day when the user is again at home. Another cluster may correspond to fixes obtained when the user is at work. Clusters may be based on any criteria, and in some cases may be defined arbitrarily for a given data stream.

Examples of different streams that can be collected from the data sources 210 and clustered are as follows. Other data streams and clusters, and/or techniques for clustering data streams, are also possible.

Audio environment: Includes batches of microphone data, each batch obtained over a specified duration, e.g., approximately one minute. Each cluster corresponds to a distinct audio environment.

Latitude/longitude coordinates: Obtained through location fixes (e.g., from GPS or another satellite positioning system). Each cluster corresponds to a macro place (i.e., a place the size of a building) that a user visits.

Wi-Fi fingerprints: Includes sets of visible Wi-Fi access points, their respective received signal strengths, e.g., given as a signal strength indication (RSSI), and their respective response rates (i.e., the fraction of the time they are visible when successive scans take place). Each cluster corresponds to a micro place (i.e., a place the size of a room) that a user visits.

Bluetooth (BT) fingerprints: Includes sets of visible BT devices, their respective signal strengths (e.g., given as RSSI), their device classes, and their respective response rates. Each cluster corresponds to a distinct BT environment.

Motion states: Includes batches of accelerometer, gyroscope and/or magnetometer data, each batch obtained over a specified duration (e.g., approximately 10-30 seconds). Each cluster corresponds to a distinct set of motions.

Calendar events: Includes information such as event descriptions and/or titles, dates/times, locations, names of attendees and/or other associated people, etc. Each cluster corresponds to a set of events with similar names, locations, and/or other attributes.

Returning to FIG. 2, a technique utilized by system 200 for clustering data is as follows. For simplicity of description, the following is described with respect to clusters utilized from only one data stream, although the following description could apply to multiple data streams. Here, clusters are processed by the clustering module 240 and are used by the context inference module 260 to infer a user's context using the following steps. Other steps, or variations of the following steps, could be used as further described herein.

1) Cluster the data stream, e.g., via the clustering module 240. This involves assigning each data point to one of a finite number of cluster IDs. Each cluster ID is assigned a model that represents it so that future data points can be compared to different cluster models to determine similarity.

2) Compile statistics, e.g., via the statistics module 230. For each cluster discovered, associate with it relevant statistics from low-level features and inferences computed when the user was in this cluster.

3) Assign context labels, e.g., via the context modeling module 250. For each cluster, learn a context label based on the compiled low-level feature/inference statistics. In the simplest case, this can be done by averaging the low-level features/inferences in some way. For example, computations can be performed for each cluster ID including the average fraction of time speech is detected, the average number of Bluetooth devices that are visible, and its most commonly occurring motion state. If for a particular cluster the fraction of speech is greater than some threshold, the average number of Bluetooth devices is greater than some threshold and the most common motion state is "rest," then an appropriate context label, e.g., "in meeting," can be assigned to the cluster.

4) Infer context, e.g., via the context inference module 260. At a later point in time, for the user's current data stream, find the cluster with the closest matching model to the current data and output its label as the inferred context.

Figure 4:
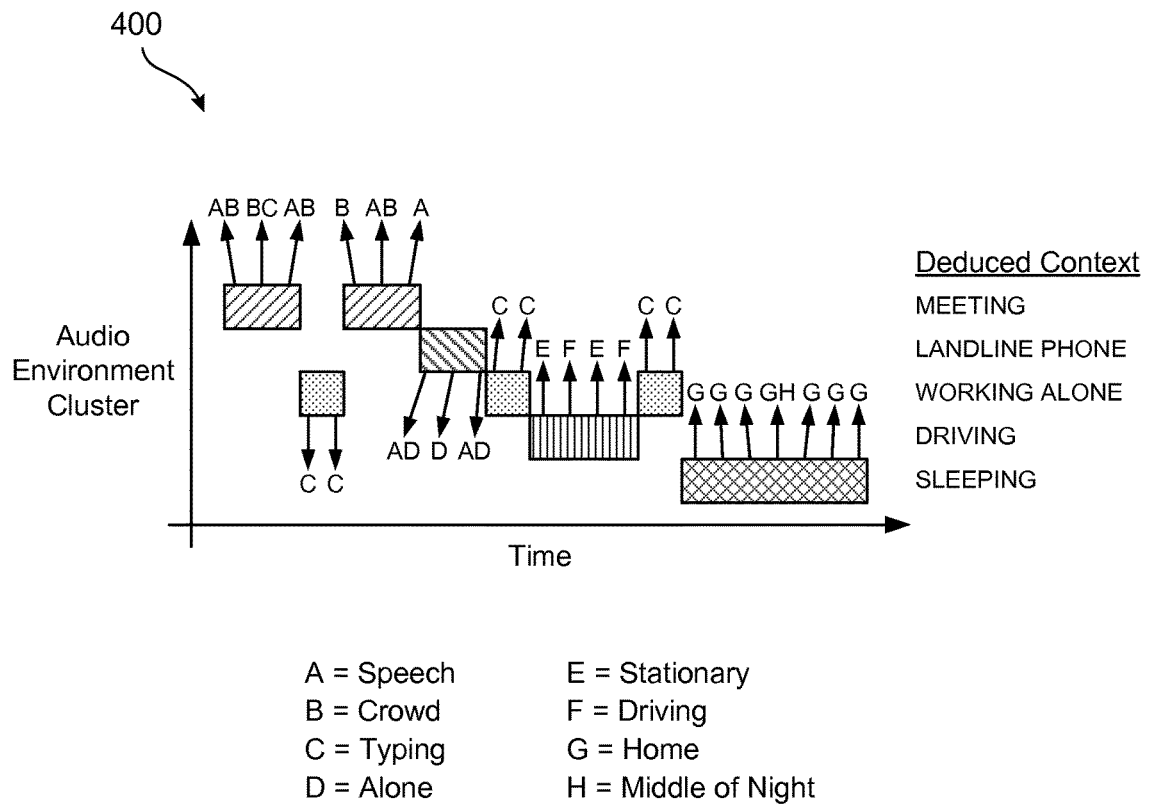

The above process is illustrated by diagram 400 in FIG. 4. In the example shown in diagram 400, several hours of audio environment data are clustered. The x-axis shows time and the y-axis shows the cluster number. The low-level features/inferences computed at the various points in time are illustrated. The low-level features and inferences are labeled in diagram 400 as A-H, which are defined below the diagram body. Five audio environment clusters are discovered, and the temporal sequence of traversal through the clusters is illustrated. The topmost cluster is revealed to contain a significant amount of speech and crowd features and a little bit of typing. This audio environment cluster is given the context label MEETING. The second cluster is revealed to contain some speech, and many instances of the user being alone. This cluster is given the context label LANDLINE PHONE. Similar processing is applied to the third and fourth clusters. The bottommost cluster contains many instances of the home inference, and also lasts throughout the night. The context label SLEEPING is assigned to this audio environment.

Although in general the set of context labels used can be arbitrary, in the above example, the context labels represent user situations. In a different example, the context labels may represent enterprise place types, e.g., GYM, CAFETERIA, OFFICE, MEETING ROOM, BREAK ROOM, LECTURE HALL, etc. These may be learned based on Wi-Fi fingerprint based (e.g., "micro-place") clustering. Each micro-place may correspond to a room/area, and the context labels may correspond to a description of this room/area. The context label can then be learned based on features/inferences such as speech, motion state, Bluetooth device density, ambient audio energy level, time of day visited, amount of time spent in the cluster, etc.

In the above example, clusters are assumed not to cross context boundaries. If the data streams clustered are location or audio environment, and the context labels relate to the users situation or place type (as in the above examples), then this assumption is typically correct. For example, when a user enters a meeting, changes are typically observed in both place (e.g., from their office to a conference room) and audio environment (e.g., from an audio environment corresponding to walking to one corresponding to a meeting). In some embodiments, clusters and/or contexts may be inferred or determined in circumstances where the clusters cross context boundaries.

The techniques described herein for clustering data and using the clustered data to perform context inference can be applied to a variety of use cases. Examples of these use cases include, but are not limited to, the following:

In-vehicle detection (e.g. driving): Leverage GPS velocity and GPS-based latitude/longitude trajectories as low-level features to label audio environment clusters. Use current audio environment cluster to classify in-vehicle vs. non in-vehicle.

Measuring hours slept: Leverage home inference and time of day (i.e., middle of night) as low-level features to label audio environment clusters as sleeping clusters vs. not sleeping clusters. Measure hours slept by number of hours spent in sleeping clusters.

Indoor/outdoor detection: Leverage a number of low-level features to label micro-place clusters as indoor or outdoor. Features include, e.g., number of visible satellites and corresponding signal strength (e.g., given as RSSI or other measures); number of visible Wi-Fi APs and corresponding signal strengths (e.g., given as RSSI or other measures); visibility of stationary Bluetooth devices based on broadcasted device ID (e.g., desktop computers, printers, etc.); target sound detection (indoor/outdoor) on an audio signal; ambient light sensor readings or recordings; camera red/green/blue (R/G/B) intensity, which gives light color from which type of light source can be determined (e.g., fluorescent vs. natural light); and so on. Classify indoor vs. outdoor from current micro-place cluster.

In-meeting detection: Leverage a number of low-level features to label micro-place clusters as indoor or outdoor. Features include, e.g., number of personal Bluetooth devices visible; target sound detection; time of day; home/work inference; etc. Classify in-meeting vs. not in-meeting using current micro-place cluster.

Zone (e.g. Home/Work/Other/In-Transit) detection: Leverage a number of low-level features to label macro-place clusters as home/work/other. Classify zone based on current macro-place cluster. Absence of a current macro-place cluster can be associated with an in-transit inference. Features include, e.g., time of day; number of hours spent in cluster; longest time spent in cluster; frequency of time spent in cluster at a given time (e.g., 3:00 am); etc.

Returning again to FIG. 2, system 200 may also be utilized to cluster multiple data streams. When more than one data stream is clustered (e.g., audio environment and micro-place), the inference procedure described above for one data stream may be augmented. An example augmentation of the above procedure to cluster and utilize multiple data streams follows. Other augmentations may also be used.

1) Cluster each data-stream separately, e.g., via the clustering module 240. For each clustered data stream, assign each data point to one of a finite number of cluster IDs. Each cluster ID is assigned a model that represents it so that future data points can be compared to different cluster models to determine similarity.

2) Compile statistics, e.g., via the statistics module 230. For each data stream, associate each discovered cluster with all of the low-level features and inferences computed when the user was in this cluster.

3) Assign context labels and confidence values, e.g., via the context modeling module 250. For each data stream, learn a context label for each cluster ID based on the compiled low-level features/inferences. Associate a confidence value with each learned context label. For example, if a particular audio cluster has very close to a fraction of speech and Bluetooth density expected to be seen in a meeting, assign the context label "meeting" and associate a high confidence value with this cluster/label. If a particular micro-place cluster has a fraction of speech and a Bluetooth density that are somewhat (but not particularly) close to the levels expected for a meeting, assign the context label "meeting" but associate a low confidence value with this cluster/label.

4) Infer context, e.g., via the context inference module 260. At a later point in time, for each data stream the user is determined to be in a particular cluster. If there are multiple clusters with conflicting context labels, select the context label with the highest confidence value.

In some cases, the clustering module 240 can be configured to cluster data jointly in step (1) described above. For instance, the clustering module 240 may be configured to treat each distinct combination of sub-clusters as a separate cluster. As an example, if there are M audio clusters and N place clusters, MN joint clusters can be created. Also or alternatively, the clustering module 240 may be configured to assign one cluster to each distinct group of data coming from multiple sensors.

To account for the possibility that the current data stream is not consistent with any previously observed clusters, i.e., it comes from a new, as-yet-unseen cluster, the context inference module 260 can be configured to first include a distance test before performing the actions described in step (4) above. The distance test determines the distance of the current data stream from the nearest cluster model. If this distance is greater than a certain threshold, this indicates that there are no known clusters associated with a context label having at least a threshold degree of relation to the current data stream. Thus, no context is inferred, and the context inference module 260 outputs "unknown context," "previously unseen context," and/or other suitable labels.

In steps (3) and (4) above, confidence values may be assigned to learned context labels by the context modeling module 250 and/or context inference module 260 in a variety of ways. A more general approach is to assign, for each cluster, a posterior probability for each of the possible context labels such that the posterior probabilities add to one when summed over all possible context labels. In the fusion step these probabilities are combined in some way across the various data streams, e.g., by multiplication. For example, if the current audio cluster has a 0.8 probability for context=MEETING and a 0.2 probability for context=NOT MEETING, and the current place cluster has a 0.4 probability for context=MEETING and a 0.6 probability for context=NOT MEETING, then the overall inference would assign a value of 0.8×0.4=0.32 for context=MEETING and a value of 0.2×0.6=0.12 for context=NOT MEETING. As the context label MEETING has a higher value, it is provided as the output label.

The output of the context inference module 260 from step (4) as described above for one data stream or multiple data streams can take various forms. Possible outputs include a hard decision output corresponding to a context with a highest confidence value, a soft decision output corresponding to a probability distribution of the most likely context(s) (e.g., output as a vector of probabilities), etc. Other outputs are also possible.

Figure 5:
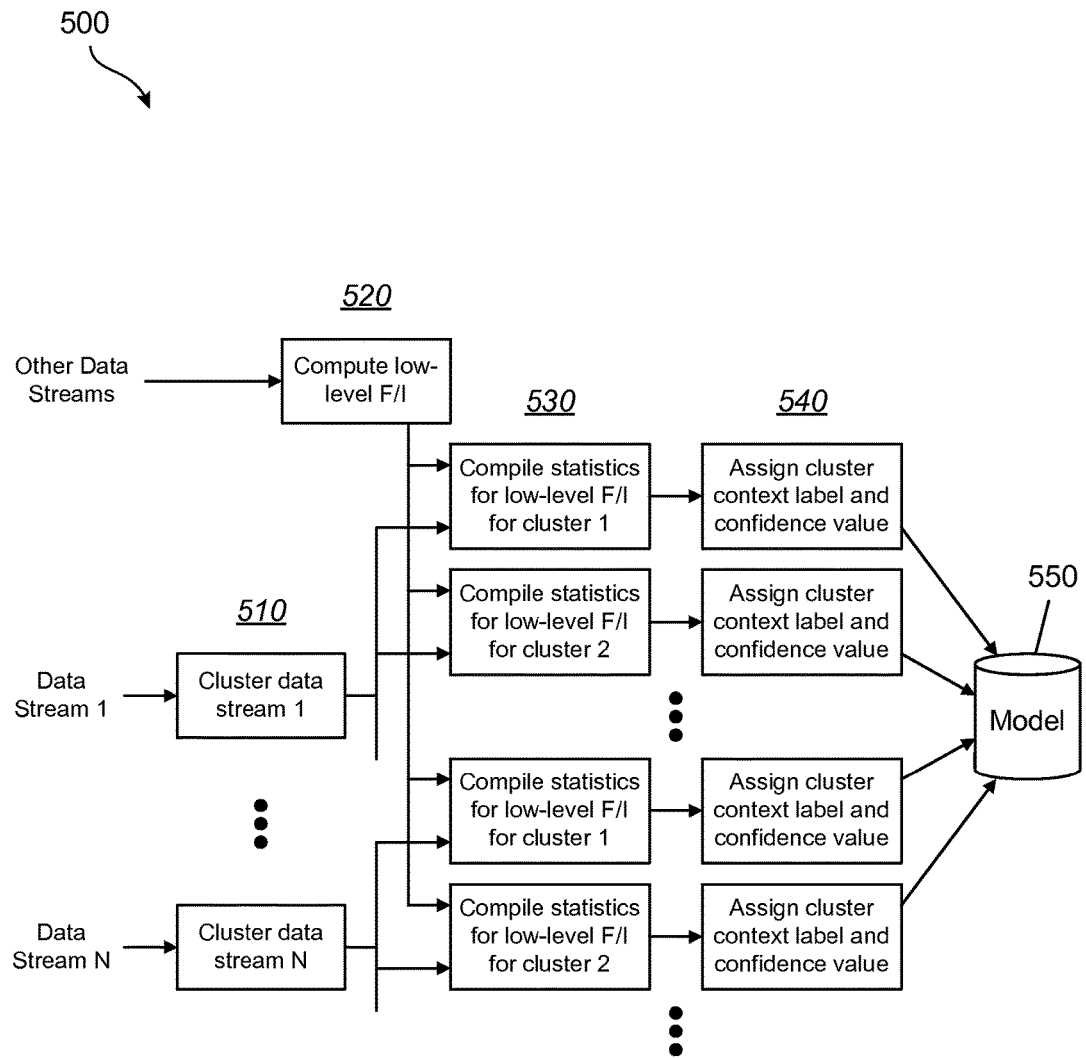
FIG. 5 is a functional block diagram of a system for learning context labels for clusters.
Figure 6:
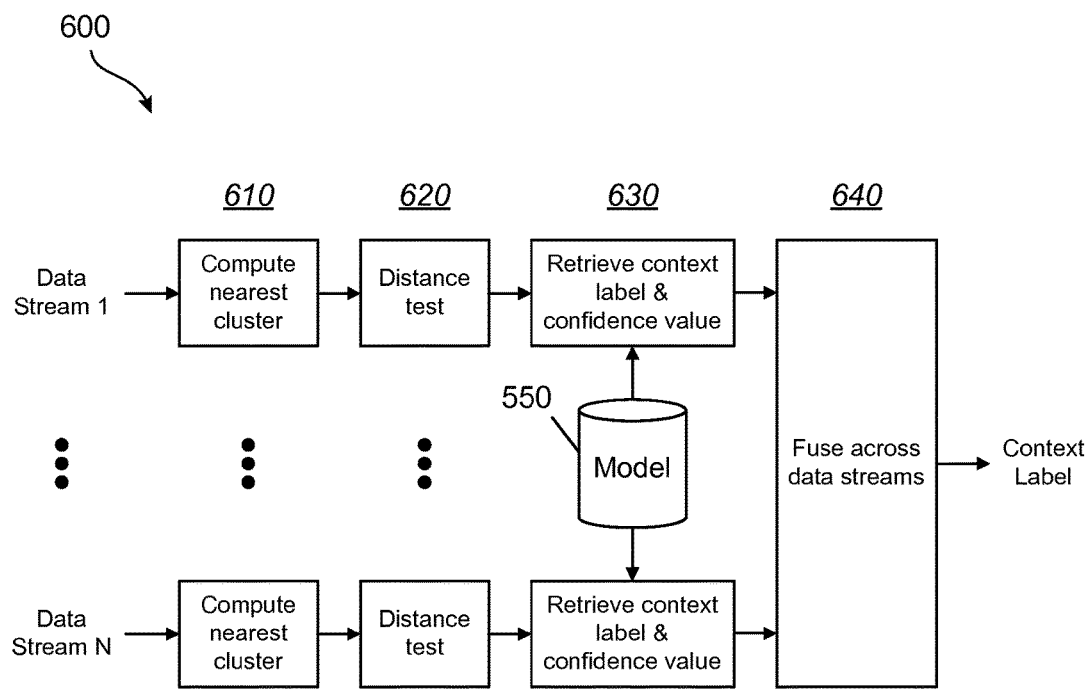
FIG. 6 is a functional block diagram of a system for inferring context for new data.

The context label learning steps as described above are illustrated by diagram 500 in FIG. 5. The context label inference steps described above are illustrated by diagram 600 in FIG. 6. In general, diagram 500 shows the construction of a universal context model, e.g., that may be developed at a mobile device in real time or initially built at the mobile device offline based on observed or imported data streams, or that may be determined by a device such as a server or computer prior to being transmitted or loaded onto another device such as a mobile device. The model is composed of clusters, which are formed at stage 510 from N data streams, e.g., via the clustering module 240. Low-level features and inferences (F/I) are also computed for other data streams at stage 520, e.g., via the statistics module 230. For each cluster, the relevant statistics for low-level features and inferences (e.g., fraction of speech present in the cluster) are computed at stage 530, e.g., using the statistics module 230. These statistics enable a label to be assigned to the cluster at stage 540 (e.g., by the context modeling module 250), yielding a model 550 that contains mappings between clusters and their labels. In this way, information obtained from other data streams may be used to characterize and/or label one or more clusters. Based on this model, diagram 600 shows that during subsequent tracking, the nearest cluster(s) associated with data sampled from N data streams are computed at stage 610. These cluster computations are verified using the distance test described above at stage 620. A cluster in which a user is observed to be at stages 610, 620 is then associated with a context at stage 630 based on the model 550 compiled as shown in diagram 500. Subsequently, multiple clusters and/or context labels may be fused at stage 640. Here, each of the stages 610, 620, 630, 640 is performed using the context inference module 260; however, other configurations are also possible.

Rules for associating statistics with labels can be predefined and/or learned based on training data. As an example, a rule may be predefined for location data such that a location at which a user spends the most time between 3:00-5:00 am is deemed to be the user's home. This rule, and other similar rules, may be modified and/or replaced based on training data, user preferences, or the like.

As additionally noted above, multiple data streams may be utilized to enhance context detection accuracy. As an example, a context inference based on location data alone may give low confidence values to all device contexts associated with the device's location (e.g., home, office, etc.). Thus, the location data can be combined with other data, such as time or audio data, to refine the context inference.

As noted above, context inference is performed based on low-level features and inferences. A list of possible low-level features that can be computed from device sensor data or external sources includes, but is not limited to, the following:

GPS velocity, accuracy, altitude
GPS satellites visible
Time of day, day of week, weekday/weekend, public holiday
Weather, temperature
Ambient light sensor readings
Proximity sensor readings
Camera data, intensity, R/G/B intensity, features such as DCT (discrete cosine transform) coefficients, object(s) detected in camera field of view
Closest geographic points of interest (POIs)
Bluetooth devices visible and corresponding RSSIs, new/old Bluetooth devices within range
Wi-Fi APs visible and corresponding RSSIs, new/old Wi-Fi APs visible
Ambient audio energy level
Movement detection (any device movement vs. no device movement)

Similarly, a list of possible low-level inferences that can be computed from device sensor data or external sources includes, but is not limited to, the following:

Motion state (walking, running, driving, etc.)
Device position (pocket, hand, desk, bag, etc.)
Speech detection (speech/no speech)
Speaker recognition (device owner speaking/someone else speaking)
Number of speakers present
Target sound detection (baby crying/not crying, etc.)
Zone (Home/Work/Other/In transit or Residential/Commercial, etc.)
Device usage (number of screen touches per minute, number of characters typed per minute, etc.)
Display ON vs. OFF
Application usage (type of application running (e.g. game, email, etc.), number of applications simultaneously running, etc.)

In the case of learning context labels for clusters, it is also possible to use low-level statistics derived from the clusters themselves. These statistics include, but are not limited to, the following:

Fraction of time spent in cluster
Duration of visits to cluster
Sojourn time between visits to the cluster
Number of clusters visited on sojourns
Relative frequency of occurrence of cluster (e.g., second most frequent)

For example, clusters that last for approximately one hour are more likely to correspond to contexts such as being in a meeting or lecture. Clusters that have a sojourn time of 8-9 hours between visits are more likely to correspond to commute periods. Clusters that have durations of 6-8 hours are more likely to correspond to sleeping periods. Other such inferences are possible.

Figure 7:
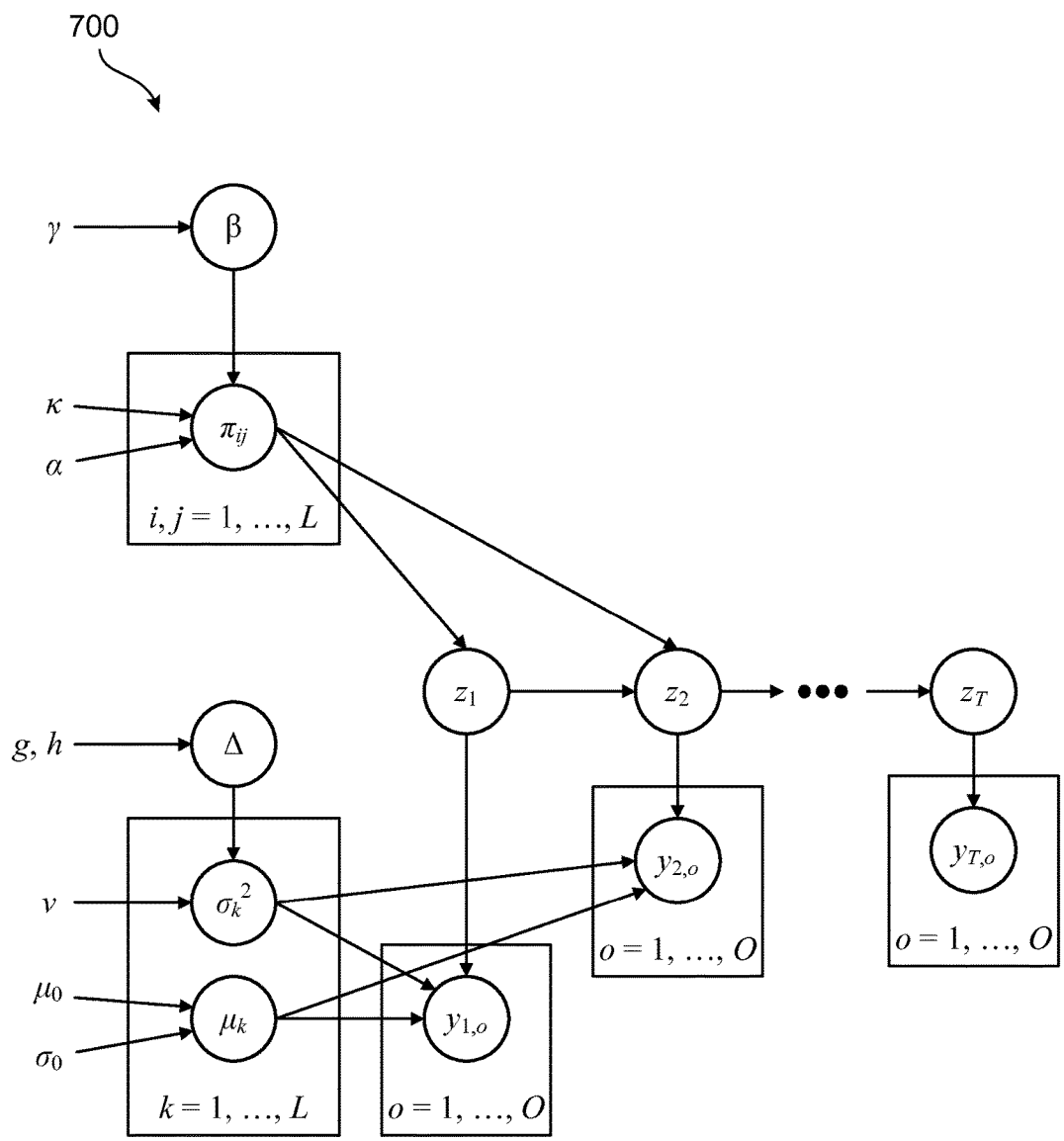
FIG. 7 is an illustrative view of an example model used to cluster audio environment data.

The clustering module 240 can utilize various techniques for data clustering. An example of audio environment clustering is given by diagram 700 in FIG. 7. Here, a model is initially configured with a number of states L that is larger than the anticipated number of states, e.g., L is chosen such that L>>K. In the model, $z_t$ represents the hidden cluster ID of the audio environment during the t-th minute of the data where t=1, . . . , T. The variable $y_{t,o}=[Y_{1,t,o} \cdots y_{13,t,o}]$ represents the 13-dimensional Mel-Frequency Cepstral Coefficient (MFCC) feature vector computed from the raw audio data stream observed during the t-th minute of the data. The variable O represents the number of feature vectors computed per minute. Here, O=60, although other values could also be used. The stored data encapsulates the MFCC feature vectors by the following statistics:

$$yS(d,t)=\Sigma_{o=1}^{O} y_{d,t,o};$$

$$yS2(d,t)=\Sigma_{o=1}^{O} y_{d,t,o}^2.$$

The cluster ID at a given point in time is a function of the cluster ID at the previous point in time, represented by the arrow connecting $z_{t-1}$ to $z_t$. The remaining variables represent the various parameters of the clustering model.

Figure 8:
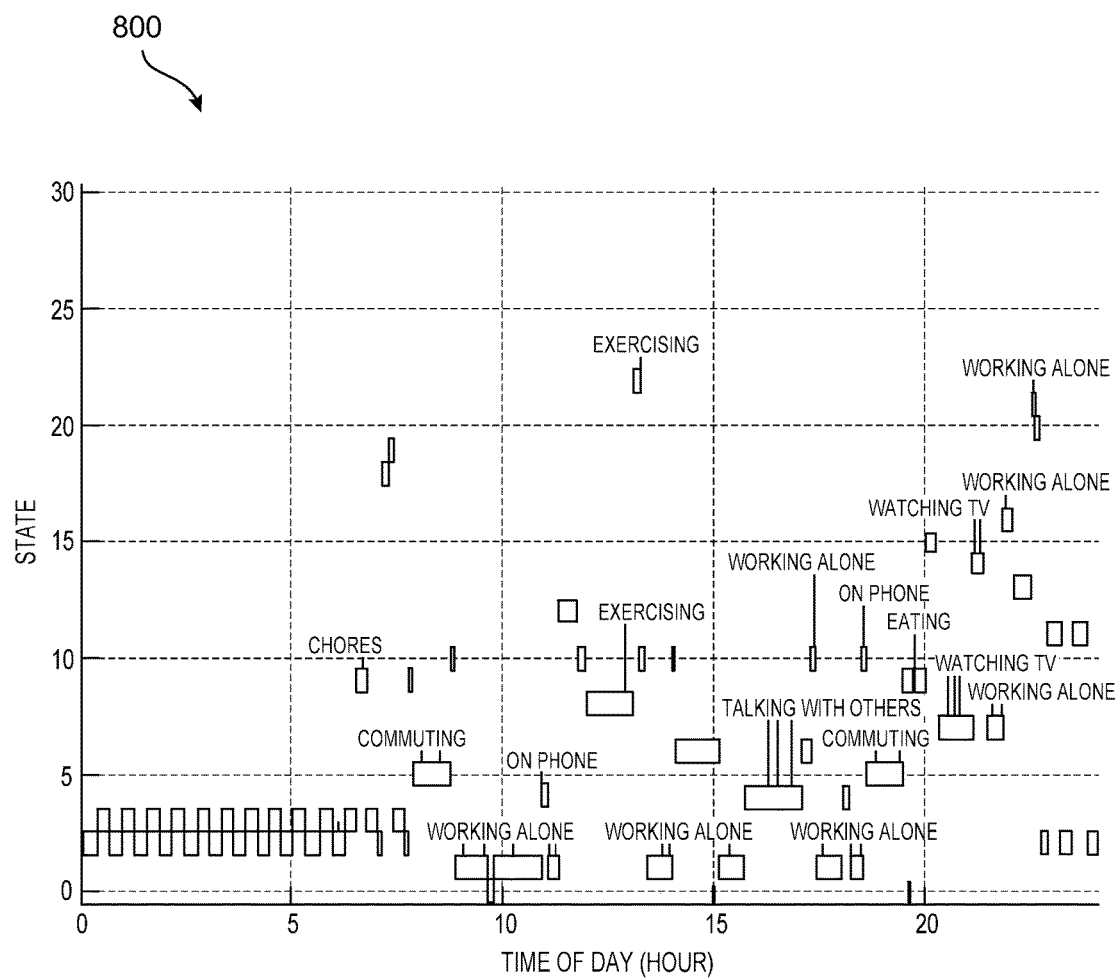
FIG. 8 is an illustrative view of an implementation of audio clustering techniques as described herein.

An example of the efficacy of this audio environment clustering technique on real sensor data corresponding to a user is illustrated by diagram 800 in FIG. 8. The x-axis shows time for 1 complete day. The y-axis shows inferred cluster ID based on training the model using 2 weeks of prior data from the same user. The context labels are illustrated on the plot at the times at which they were provided by the user.

The techniques described above enable the context inference module 260 to infer context indirectly by firstly using the low-level features/inferences to label the clusters, and secondly using these labeled clusters to perform inference. In some cases, the cluster-based inferences can be augmented with instantaneous low-level feature/inference data. This is done by configuring the context inference module 260 to perform separate context inferences, one via clusters and one via low-level features/inferences (e.g., obtained from the statistics module 230), and fusing them in a manner similar to the fusion of inferences that occurs between clusters. More specifically, this is done by augmenting the final stage of the above inference procedure performed by the context inference module 260, e.g., as follows.

4) Infer context: At a later point in time, for each data stream the user is determined to be in a particular cluster with an associated context label and a computed confidence value. Instantaneous low-level features are also computed. Based on these, a context label is derived with an associated confidence value. The final inferred context is computed by taking the derived context with the highest confidence value, chosen from the derived contexts outputted by each of the clusters, and the low-level features/inferences.

For example, if the user is driving in a car, the system is attempting to distinguish between "driving in car" and "riding on bus" contexts, the audio environment and place clusters suggest the "riding on bus" context but with low to medium confidence, and the GPS velocity feature determines that the user is moving at 75 mph, the instantaneous context label derived from the low-level features would be "driving in car" with high confidence. In this case, the context label derived from the low-level features would override the context label derived from the audio environment cluster.

Similar to the above, in the inference step there are various ways of assigning confidence values to derived context labels. A more general approach is, for each cluster and for the set of low level features/inferences, to assign a posterior probability to each of the possible context labels such that the posterior probabilities add to one when summed over all possible context labels. In the fusion step these probabilities are combined in some way across the various data streams, typically by multiplication. For example, if the current audio cluster has a 0.8 probability for context=MEETING and a 0.2 probability for context=NOT MEETING, and the instantaneous low-level features/inferences yield a 0.4 probability for context=MEETING and a 0.6 probability for context=NOT MEETING, then the overall inference would assign a value of 0.8×0.4=0.32 for context=MEETING and a value of 0.2×0.6=0.12 for context=NOT MEETING. The resultant output would be the context label MEETING as it has a higher value.

In some embodiments, the context inference module 260 may determine whether computing instantaneous low-level features and/or gathering additional data (e.g., by activating or utilizing a sensor) for such computing is to be performed prior to the augmented stage (4) as described above. For example, when a context cannot be determined by the context inference module 260 with a confidence above a certain threshold, one or more sensors may be configured to collect additional data. This determination may be performed after the low-level features are computed in order to determine whether to collect additional data and/or perform additional computation. Different confidence levels for one or more contexts may also be mapped to respective sensors of a device that may, in turn, be utilized to achieve those confidence levels.

By selectively computing or gathering additional data as discussed above, power usage may be reduced. Such selective data gathering may be achieved by turning on/off sensor sampling based on, for example, one or more of the following:

the number of sensor samples already obtained to date;
the current cluster ID;
the temporal sequence of clusters seen to date, e.g., cluster ID sequence 3, 4, 3 or 1, 4, 3, 5 may trigger sensor sampling to take place;
the number of samples obtained during previous occurrences of the current cluster ID, e.g., if the number of GPS scans already performed for a current Wi-Fi cluster ID exceeds a threshold of 10, don't sample;
the number of samples obtained during previous occurrences of a current temporal sequence of clusters, e.g., in all previous occurrences of the temporal cluster sequence 3, 4, 3, a total of 10 samples may have been obtained, which may result in sampling being enabled/disabled on future occurrences of the temporal sequence 3, 4, 3;
values of the sensor samples obtained to date;
values of the sensor samples obtained during previous occurrences of the current cluster ID, e.g., if GPS scans performed for the current Wi-Fi cluster already definitively show clear satellite visibility, future GPS scans may be disabled for the current cluster, or if GPS scans performed for the current Wi-Fi cluster are ambiguous, GPS scanning may continue for the current cluster;
values of the sensor samples obtained during previous occurrences of a current temporal sequence of clusters;
the accuracy (or confidence) at which a target inference can currently be made given the sensor samples collected to date; and/or
the estimated increase in utility resulting from collecting additional sensor samples.

A decision regarding sampling may also be based on the above quantities failing to exceed a pre-defined threshold. Additionally or alternatively, the decision may be made probabilistically. For example, the probability of turning on sensor sampling may be inversely proportional to the number of samples already collected.

Figure 9:
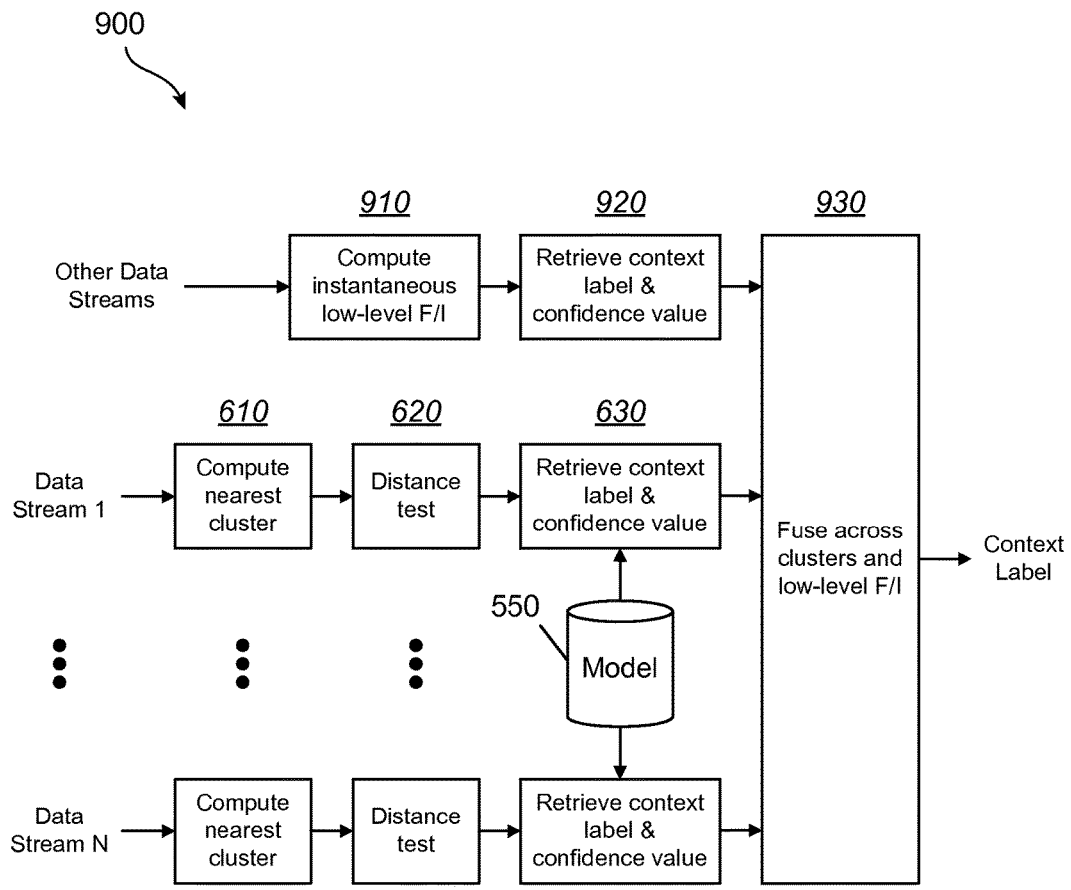
FIG. 9 is a functional block diagram of a system for fusing context from clusters and instantaneous low-level features and inferences.

The fusing of context derived from instantaneous low-level feature/inferences and from clusters as described above is illustrated by diagram 900 in FIG. 9. Here, context labels associated with N data streams are obtained at stages 610, 620, 630 (e.g., via the context inference module 260) using the model 550 in a similar manner to that described above with respect to diagram 600 in FIG. 6. Additionally, instantaneous low-level features and inferences are computed from other data streams at stage 910 (e.g., via the statistics module 230), and context labels associated with these instantaneous features and inferences are retrieved (e.g., from the model 550) at stage 920. Subsequently, the context labels obtained at stages 630 and 920 are fused across all of the associated clusters and the low-level features and inferences at stage 930. Here, the stages 920, 930 are performed by the context inference module 260; however, other configurations are also possible.

Figure 10:
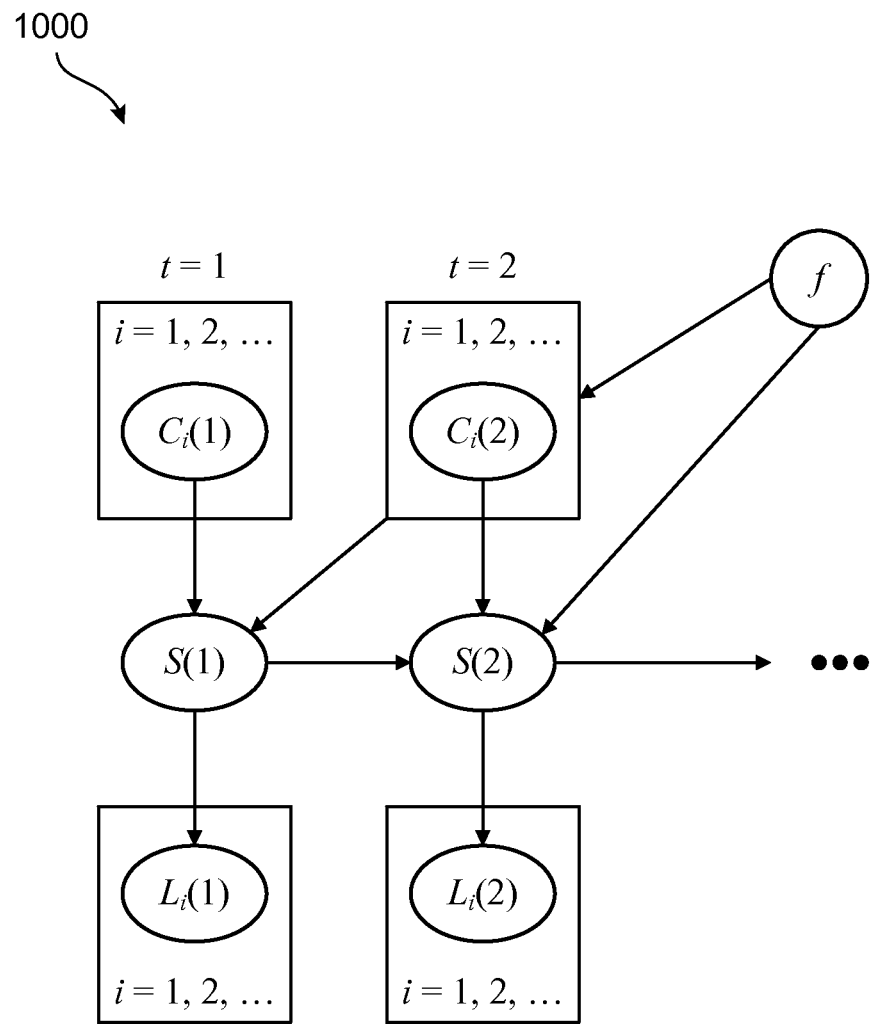
FIG. 10 is an illustrative view of a probabilistic graphical model for fusing context from clusters and instantaneous low-level features and inferences.

To perform the fusion described above, a probabilistic graphical model, such as that illustrated by diagram 1000 in FIG. 10, may be used by the context inference module 260. Here, the variable S(t) represents the context of the user during minute t. Thus, S(t) may be MEETING, WORKING ALONE, DRIVING, etc. The variable $C_i(t)$ represents the ID of the cluster type i during the minute t. Thus, $C_1(t)$ may represent the audio environment cluster ID in the t-th minute and $C_2(t)$ may represent the Wi-Fi based cluster in the t-th minute. The variable $L_i(t)$ represents the i-th low-level feature or inference during the minute t. Thus, $L_1(t)$ may represent whether or not there is speech in the t-th minute, $L_2(t)$ may represent the motion state, $L_3(t)$ may represent the GPS velocity, etc. The variable f represents the cluster models (e.g., the context label associated with each cluster). The arrow linking S(t−1) to S(t) represents the fact that the context in minute t is correlated with the context in minute t−1. By running inference algorithms on this graph (such as the Viterbi algorithm or the forward-backward algorithm), the contexts S(t) can be inferred from the computed clusters and low-level features and inferences.

There are various ways of determining a context label for a cluster based on the statistics of the low-level features/inferences compiled during the occurrences of the cluster. The approach mentioned earlier involves arbitrarily thresholding each statistic to determine whether or not it is indicative of a particular context. Another approach involves collecting labeled data from a large number of training users in order to learn appropriate thresholds to use. Alternatively, the data collected can be used to train the probabilistic graphical model in FIG. 10.

Figure 11:
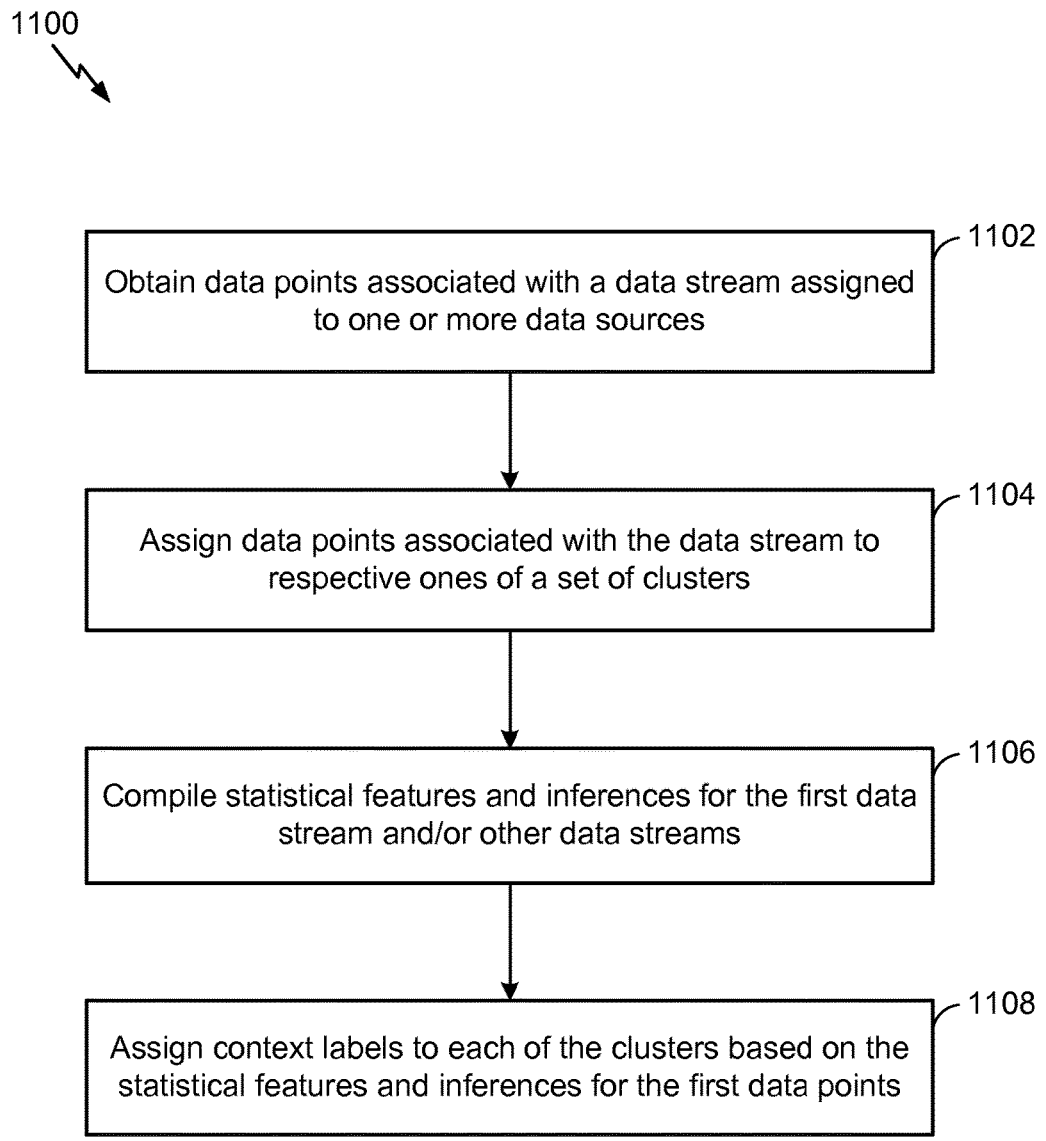
FIG. 11 is a block flow diagram of a process of applying context labels to data clusters.

Referring to FIG. 11, with further reference to FIGS. 1-10, a process 1100 of applying context labels to data clusters includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, data points associated with a data stream assigned to one or more data sources 210 are obtained.

At stage 1104, the data points obtained at stage 1102 are assigned to respective ones of a set of clusters, e.g., by a clustering module 240. The clusters may be previously identified clusters or new clusters, as described above.

At stage 1106, statistical features and/or inferences are compiled, e.g., by a statistics module 230, for the first data stream and/or other data stream(s) associated with respective other data sources. Examples of features/inferences that can be compiled are described above. Other features/inferences are also possible.

At stage 1108, context labels are assigned to each of the clusters, e.g., by a context modeling module 250, based on the statistical features and inferences compiled at stage 1106.

Figure 12:
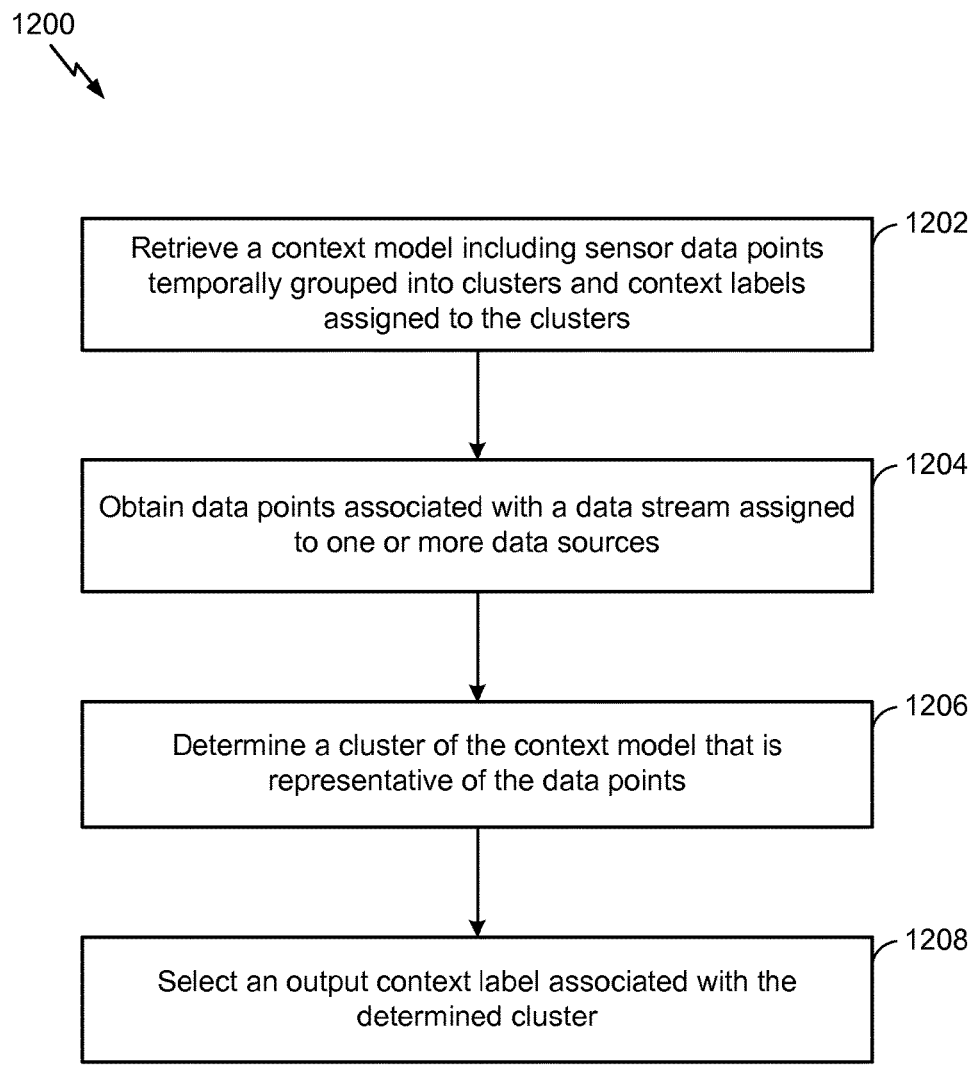
FIG. 12 is a block flow diagram of a process of inferring a device context using collected sensor data and a context model.

Referring to FIG. 12, with further reference to FIGS. 1-10, a process 1200 of inferring a device context using collected sensor data and a context model includes the stages shown. The process 1200 is, however, an example only and not limiting. The process 1200 can be altered, e.g., by having stages added, removed, rearranged, combined, and/or performed concurrently. Still other alterations to the process 1200 as shown and described are possible.

At stage 1202, a context model is retrieved, e.g., from a context modeling module 250 or memory, such as the memory 140. The model includes sensor data points, which are temporally grouped into respective ones of a set of clusters. The model also includes context labels assigned to each of the set of clusters.

At stage 1204, data points associated with a data stream assigned to one or more data sources 210 are obtained.

At stage 1206, a cluster of the context model that is representative of the data points obtained at stage 1204 is determined (e.g., by the context inference module 260). This determination may be based on statistical features/inferences associated with the data points, as determined by the statistics module 230. Alternatively, the data points may be determined at stage 1206 to not correspond to any cluster of the model. In this case, an "uncategorized" or "unknown" label may be used, a new cluster and/or context label may be created, or other actions may be taken.

At stage 1208, an output context label is selected as the context label associated with the cluster determined at stage 1206 is determined. This context label is then provided as a device context inference to one or more applications associated with a device for which process 1200 operates.

Figure 13:
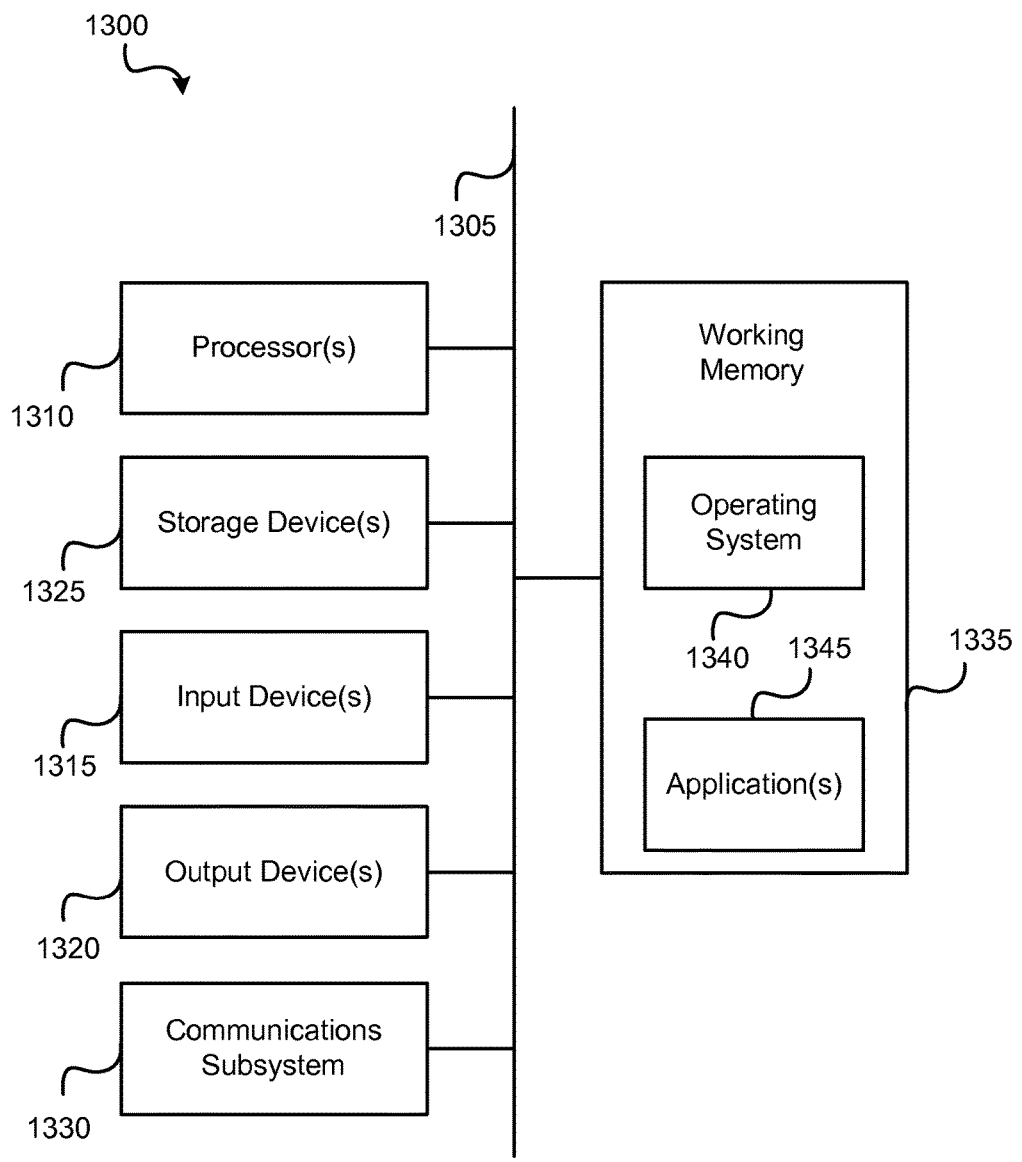
FIG. 13 illustrates a block diagram of an embodiment of a computer system.

A computer system 1300 as illustrated in FIG. 13 may be utilized to at least partially implement the functionality of the previously described computerized devices. For example, the computer system 1300 can be utilized to at least partially implement the processes 1100, 1200 shown in FIGS. 11-12 in software. The computer system 1300 may also be implemented via one or more of the components of the mobile device 100 shown in FIG. 1, such as the general-purpose processor 111 and/or memory 140. The computer system 1300 may additionally or alternatively be used to provide at least a partial software implementation of the system 200 shown in FIG. 2 and/or one or more of its components, such as modules 230, 240, 250, 260. Other implementations of the computer system 1300 are possible. For example, the input devices 1315 may comprise and/or be used to implement any of the sensors 125 shown in FIG. 1 and or the data sources 210 shown in FIG. 2. Further, the processor 1310 and/or portions of the working memory 1335, such as either the operating system 1340 or the application 1345 in combination with the processor 1310 or operating independently, may comprise and/or be used to implement any of the modules 230-260 shown in FIGS. 2 and 3. In some embodiments, the processor 1310 may comprise and/or be used to implement the processor 111 and/or the DSP 112, as shown in FIG. 1, and one or both of the working memory 1335 and the storage device 1325 may comprise and/or be used to implement the memory 140, also shown in FIG. 1.

FIG. 13 provides a schematic illustration of one embodiment of a computer system 1300 that can perform the methods provided by various other embodiments, as described herein, and/or can function as a mobile device or other computer system. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include without limitation a mouse, a keyboard and/or the like; and one or more output devices 1320, which can include without limitation a display device, a printer and/or the like. The processor(s) 1310 can include, for example, intelligent hardware devices, e.g., a central processing unit (CPU) such as those made by Intel® Corporation or AMD®, a microcontroller, an ASIC, etc. Other processor types could also be utilized.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1300 might also include a communications subsystem 1330, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 will further comprise a working memory 1335, which can include a RAM or ROM device, as described above.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer), and such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as the system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1300) may be used to perform methods in accordance with the disclosure. Some or all of the procedures of such methods may be performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1325. Volatile media include, without limitation, dynamic memory, such as the working memory 1335. Transmission media include, without limitation, coaxial cables, copper wire and fiber optics, including the wires that comprise the bus 1305, as well as the various components of the communication subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300. These signals, which might be in the form of electromagnetic signals, acoustic signals, optical signals and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1305 retrieves and executes the instructions. The instructions received by the working memory 1335 may optionally be stored on a storage device 1325 either before or after execution by the processor(s) 1310.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for managing a context model associated with a mobile device, the method implemented by the mobile device, comprising:
    obtaining first data points associated with a first data stream assigned to one or more first data sources, the one or more first data sources comprising one or more sensors of the mobile device;
    identifying a set of clusters in the first data stream;
    assigning ones of the first data points to a respective cluster of the identified set of clusters such that the respective cluster of the identified set of clusters is assigned the ones of the first data points that exhibit a threshold amount of similarity and are associated with times within a threshold amount of time of each other;
    computing features and inferences present in the respective cluster from the ones of the first data points in the respective cluster;
    compiling statistics associated with the features and inferences present in the respective cluster as computed from the ones of the first data points in the respective cluster;
    assigning a context label and a confidence level to the respective cluster based on the statistics associated with the features and inferences present in the respective cluster as computed from the ones of the first data points in the respective cluster, wherein the assigning the context label comprises selecting the context label from a set of context labels for the respective cluster of the identified set of clusters;
    identifying at least one cluster among the identified set of clusters having less than a threshold degree of relation to any context label associated with the identified set of clusters; and
    assigning an unknown context label to the at least one cluster.

2. The method of claim 1 wherein the one or more first data sources comprise at least one of an audio sensor, a location sensor, a network sensor, a motion sensor, a camera, or a calendar.

3. The method of claim 1 wherein the features comprise at least one of satellite positioning fixes, time measurements, weather data, light sensor readings, proximity sensor readings, camera data, proximate points of interest, Bluetooth measurement, Wi-Fi measurements, ambient audio level, or movement detection.

4. The method of claim 1 wherein the inferences comprise at least one of motion state, device position, speech detection, speaker recognition, target sound detection, or location detection.

5. The method of claim 1 further comprising generating the context model using the context label assigned to the respective cluster of the identified set of clusters and using the identified set of clusters.

6. The method of claim 5 further comprising:
    obtaining second data points associated with a second data stream assigned to one or more second data sources;
    determining a cluster of the context model that corresponds to the second data points; and
    selecting an output context label associated with the determined cluster.

7. The method of claim 1 further comprising:
creating a new context label for the at least one cluster.

8. The method of claim 1 wherein:
    the obtaining comprises identifying a user of the mobile device;
    the first data points comprise data corresponding to the user of the mobile device; and
    the method further comprises creating a user context model for the user of the mobile device based on the context label assigned to the respective cluster of the identified set of clusters and based on the identified set of clusters.

9. The method of claim 1 wherein:
    the first data points comprise data corresponding to a first user of the mobile device and at least one second user of the mobile device or one or more other devices; and the method further comprises creating a multi-user context model for the first user and the at least one second user based on the context label assigned to the respective cluster of the identified set of clusters and based on the identified set of clusters.

10. A method for performing a context inference based on a context model, the method implemented by a processor, comprising:
retrieving the context model from a memory communicatively coupled to the processor, the context model comprising sensor data points temporally grouped into respective clusters of a set of clusters and a context label assigned to the respective clusters of the set of clusters;
obtaining first data points associated with a first data stream assigned to one or more first data sources, the first data sources comprising one or more sensors of a mobile device;
determining at least one cluster of the context model that is representative of the first data points, the determining based at least in part on statistics associated with features and inferences present in the at least one cluster as computed from the sensor data points in the at least one cluster, wherein the determining the at least one cluster comprises assigning a confidence level to the at least one determined cluster that corresponds to the first data points;
selecting an output context label associated with the at least one determined cluster based on the confidence level, wherein the selecting the output context label comprises selecting the output context label from a set of context labels for the set of clusters;
identifying at least one cluster among the set of clusters having less than a threshold degree of relation to any context label associated with the set of clusters; and
assigning an unknown context label to the at least one cluster.

11. The method of claim 10 wherein the selecting comprises selecting the output context label corresponding to a cluster of the context model having a highest confidence level.

12. The method of claim 10 wherein the selecting comprises generating a vector of respective ones of the set of clusters and their respective confidence levels.

13. The method of claim 10 further comprising collecting additional data from at least one sensor when the confidence level is below a confidence level threshold.

14. The method of claim 10 wherein the selecting comprises:
directing collection of additional data from the one or more first data sources; and
selecting the output context label based on the additional data collected from the one or more first data sources in response to the directing.

15. The method of claim 10 further comprising obtaining second data points associated with a second data stream assigned to one or more second data sources, wherein the determining comprises determining clusters of the context model that correspond to the first data points and the second data points.

16. The method of claim 15 wherein the selecting comprises:
selecting a first output context label associated with a first cluster that is representative of the first data points;
selecting a second output context label associated with a second cluster that is representative of the second data points; and
determining the output context label by combining the first output context label and the second output context label.

17. The method of claim 15 further comprising:
performing a first context inference based on the selected output context label;
performing a second context inference based on features and inferences derived from the second data sources; and
combining the first context inference and the second context inference to obtain a combined context inference.

18. A mobile device that facilitates managing a context model, the mobile device comprising:
a memory;
a processor communicatively coupled to the memory;
one or more first data sources communicatively coupled to the memory and to the processor and configured to provide first data points associated with a first data stream, the one or more first data sources comprising one or more sensors of the mobile device;
a clustering module communicatively coupled to the one or more first data sources and configured to identify a set of clusters in the first data stream and assign ones of the first data points to a respective cluster of the identified set of clusters such that the respective cluster of the identified set of clusters is assigned the ones of the first data points that exhibit a threshold amount of similarity and are associated with times within a threshold amount of time of each other;
a statistics module communicatively coupled to the one or more first data sources and to the clustering module and configured to:
compute features and inferences present in the respective cluster from the ones of the first data points in the respective cluster;
compile statistics associated with the features and inferences present in the respective cluster as computed from the ones of the first data points in the respective cluster; and
a context modeling module communicatively coupled to the clustering module and to the statistics module and configured to assign a context label and a confidence level to the respective cluster based on the statistics associated with the features and inferences present in the respective cluster as computed from the ones of the first data points in the respective cluster, wherein the context modeling module is configured to assigning the context label by selecting the context label from a set of context labels for the respective cluster of the identified set of clusters, wherein the context modeling module is further configured to:
identify at least one cluster among the identified set of clusters having less than a threshold degree of relation to any context label associated with the identified set of clusters; and
assign an unknown context label to the at least one cluster.

19. The mobile device of claim 18 wherein the one or more first data sources comprise at least one of an audio sensor, a location sensor, a network sensor, a motion sensor, a camera, or a calendar.

20. The mobile device of claim 18 wherein the statistics module is further configured to determine the inferences comprising at least one of motion state, device position, speech detection, speaker recognition, target sound detection, or location detection.

21. The mobile device of claim 18 wherein the context modeling module is further configured to generate the context model using the identified set of clusters and the context label assigned to the respective cluster of the identified set of clusters.

22. The mobile device of claim 21 wherein:
the mobile device further comprises one or more second data sources communicatively coupled to the clustering module and configured to provide second data points associated with a second data stream,
the clustering module is further configured to determine a cluster of the context model that corresponds to the second data points, and
the mobile device further comprises a context inference module communicatively coupled to the context modeling module and the clustering module and configured to select an output context label associated with the determined cluster.

23. The mobile device of claim 18 wherein the context modeling module is further configured to create a new context label for the at least one cluster.

24. An apparatus configured to perform a context inference based on a context model, the apparatus comprising:
a memory; and
a processor communicatively coupled to the memory;
a context modeling module communicatively coupled to the memory and configured to retrieve the context model from the memory, the context model comprising sensor data points temporally grouped into respective clusters of a set of clusters and a context label assigned to the respective clusters of the set of clusters;
one or more first data sources communicatively coupled to the processor and configured to provide first data points associated with a first data stream, the one or more first data sources comprising one or more sensors of a mobile device; and
a context inference module communicatively coupled to the context modeling module and the one or more first data sources and configured to:
determine at least one cluster of the context model that is representative of the first data points based at least in part on statistics associated with features and inferences present in the at least one cluster as computed from the sensor data points in the at least one cluster, wherein the context inference module is further configured to assign a confidence level to the at least one determined cluster that corresponds to the first data points; and
select an output context label associated with the at least one determined cluster based on the confidence level, wherein the context inference module selects the output context label by selecting the output context label from a set of context labels for the set of clusters;
identify at least one cluster among the set of clusters having less than a threshold degree of relation to any context label associated with the set of clusters; and
assign an unknown context label to the at least one cluster.

25. The apparatus of claim 24 wherein the context inference module is further configured to select the output context label corresponding to a cluster of the context model having a highest confidence level.

26. The apparatus of claim 24 further comprising one or more second data sources communicatively coupled to the context inference module and configured to provide second data points associated with a second data stream, wherein the context inference module is further configured to determine clusters of the context model that correspond to the first data points and the second data points.

27. The apparatus of claim 26 wherein the context inference module is further configured to select a first output context label associated with a first cluster that is representative of the first data points, to select a second output context label associated with a second cluster that is representative of the second data points, and to determine the output context label by combining the first output context label and the second output context label.

28. The apparatus of claim 26 wherein the context inference module is further configured to perform a first context inference based on the selected output context label, to perform a second context inference based on features and inferences derived from the second data sources, and to combine the first context inference and the second context inference to obtain a combined context inference.

29. The apparatus of claim 24 wherein the one or more first data sources comprise at least one of an audio sensor, a location sensor, a network sensor, a motion sensor, a camera, or a calendar.

30. A mobile device for managing a context model associated with the mobile device, the mobile device comprising:
means for obtaining first data points associated with a first data stream assigned to one or more first data sources, the one or more first data sources comprising one or more sensors of the mobile device;
means for identifying a set of clusters in the first data stream;
means for assigning ones of the first data points to a respective cluster of the identified set of clusters such that the respective cluster of the identified set of clusters is assigned the ones of the first data points that exhibit a threshold amount of similarity and are associated with times within a threshold amount of time of each other;
means for computing features and inferences present in the respective cluster from the ones of the first data points in the respective cluster;
means for compiling statistics associated with the features and inferences present in the respective cluster as computed from the ones of the first data points in the respective cluster;
means for assigning a context label and a confidence level to the respective cluster based on the statistics associated with the features and inferences present in the respective cluster as computed from the ones of the first data points in the respective cluster, wherein the means for assigning the context label assigns the context label by selecting the context label from a set of context labels for the respective cluster of the identified set of clusters;
means for identifying at least one cluster among the identified set of clusters having less than a threshold degree of relation to any context label associated with the identified set of clusters; and
means for assigning an unknown context label to the at least one cluster.

31. The mobile device of claim 30 further comprising means for generating the context model using the context label assigned to the respective cluster of the identified set of clusters and using the identified set of clusters.

32. The mobile device of claim 31 wherein:
the mobile device further comprises means for obtaining second data points associated with a second data stream assigned to one or more second data sensors;
the means for assigning comprises means for determining a cluster of the context model that corresponds to the second data points; and
the mobile device further comprises means for selecting an output context label-associated with the determined cluster.

33. The mobile device of claim 30 further comprising:
means for creating a new context label for the at least one cluster or assigning an unknown context label to the at least one cluster.

34. An apparatus configured to perform a context inference based on a context model, the apparatus comprising:
means for retrieving the context model from a memory, the context model comprising sensor data points temporally grouped into respective clusters of a set of clusters and a context label assigned to the respective clusters of the set of clusters;
means for obtaining first data points from one or more first data sources associated with a first data stream, the one or more first data sources comprising one or more sensors of a mobile device;
means for determining at least one cluster of the context model that is representative of the first data points based at least in part on statistics associated with features and inferences present in the at least one cluster as computed from the sensor data points in the at least one cluster, wherein the means for determining the at least one cluster comprises means for assigning a confidence level to the at least one determined cluster that corresponds to the first data points;
means for selecting an output context label associated with the at least one determined cluster based on the confidence level, wherein the means for selecting selects the output context label by selecting the output context label from a set of context labels for the set of clusters;
means for identifying at least one cluster among the set of clusters having less than a threshold degree of relation to any context label associated with the set of clusters; and
means for assigning an unknown context label to the at least one cluster.

35. The apparatus of claim 34 further comprising means for obtaining second data points from one or more second data sources associated with a second data stream, wherein the means for determining comprises means for determining clusters of the context model that correspond to the first data points and the second data points.

36. The apparatus of claim 35 wherein the means for selecting comprises:
means for selecting a first output context label associated with a first cluster that is representative of the first data points;
means for selecting a second output context label associated with a second cluster that is representative of the second data points; and
means for selecting the output context label by combining the first output context label and the second output context label.

37. The apparatus of claim 35 further comprising:
means for performing a first context inference based on the output context label;
means for performing a second context inference based on features and inferences derived from the second data sources; and
means for combining the first context inference and the second context inference to obtain a combined context inference.

38. The apparatus of claim 34 wherein the one or more first data sources comprise at least one of an audio sensor, a location sensor, a network sensor, a motion sensor, a camera, or a calendar.

39. A non-transitory computer-readable storage medium comprising processor-executable instructions configured to cause a processor to:
obtain first data points associated with a first data stream assigned to one or more first data sources, the one or more first data sources comprising one or more sensors of a mobile device;
identify a set of clusters in the first data stream;
assign ones of the first data points to a respective cluster of the identified set of clusters such that the respective cluster of the identified set of clusters is assigned the ones of the first data points that exhibit a threshold amount of similarity and are associated with times within a threshold amount of time of each other;
compile statistics associated with the features and inferences present in the respective cluster as computed from the ones of the first data points in the respective cluster;
assign a context label and a confidence level to the respective cluster based on the statistics associated with the features and inferences present in the respective cluster as computed from the ones of the first data points in the respective cluster, wherein the instructions configured to cause the processor to assign comprises instructions configured to cause the processor to select the context label from a set of context labels for the respective cluster of the identified set of clusters;
identify at least one cluster among the identified set of clusters having less than a threshold degree of relation to any context label associated with the identified set of clusters; and
assign an unknown context label to the at least one cluster.

40. The non-transitory computer-readable storage medium of claim 39 further comprising instructions for causing the processor to generate a context model using the context label assigned to the respective cluster of the identified set of clusters and using the identified set of clusters.

41. The non-transitory computer-readable storage medium of claim 40 further comprising instructions configured to cause the processor to:
obtain second data points associated with a second data stream assigned to one or more second data sources;
determine a cluster of the context model that corresponds to the second data points; and
select an output context label associated with the determined cluster.

42. A non-transitory computer-readable storage medium comprising processor-executable instructions configured to cause a processor to:
retrieve a context model, the context model comprising sensor data points temporally grouped into respective clusters of a set of clusters and a context label assigned to the respective clusters of the set of clusters;
obtain first data points from one or more first data sources associated with a first data stream, the one or more first data sources comprising one or more sensors of a mobile device;

determine at least one cluster of the context model that is representative of the first data points based at least in part on statistics associated with features and inferences present in the at least one cluster as computed from the sensor data points in the at least one cluster, wherein the instructions to determine the at least one cluster comprises instructions to assign a confidence level to the at least one determined cluster that corresponds to the first data points; and select an output context label associated with the at least one determined cluster based on the confidence level, wherein the instructions configured to cause the processor to select comprises instructions configured to cause the processor to select the output context label comprises selecting the output context label from a set of context labels for the set of clusters;

identify at least one cluster among the set of clusters having less than a threshold degree of relation to any context label associated with the set of clusters; and assign an unknown context label to the at least one cluster.

43. The non-transitory computer-readable storage medium of claim 42 further comprising instructions configured to cause the processor to:

obtain second data points from one or more second data sources associated with a second data stream; and determine clusters of the context model that correspond to the first data points and the second data points.

44. The non-transitory computer-readable storage medium of claim 43 further comprising instructions configured to cause the processor to:

select a first output context label associated with a first cluster that is representative of the first data points;

select a second output context label associated with a second cluster that is representative of the second data points; and select the output context label by combining the first output context label and the second output context label.

45. The non-transitory computer-readable storage medium of claim 43 further comprising instructions configured to cause the processor to:

perform a first context inference based on the output context label;

perform a second context inference based on features and inferences derived from the second data sources; and combine the first context inference and the second context inference to obtain a combined context inference.

46. The method of claim 1, wherein compiling the statistics associated with the features and inferences present in the respective cluster comprises averaging the features and inferences present in the respective cluster.

* * * * *